US006984043B2

(12) United States Patent
Nakamura et al.

(10) Patent No.: US 6,984,043 B2
(45) Date of Patent: Jan. 10, 2006

(54) IMAGE DISPLAY APPARATUS FOR DISPLAYING SUPERIMPOSED IMAGES FROM A PLURALITY OF PROJECTORS

(75) Inventors: Tomoyuki Nakamura, Hino (JP); Yasuhiro Komiya, Hino (JP); Takeyuki Ajito, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/441,738

(22) Filed: May 19, 2003

(65) Prior Publication Data

US 2004/0046939 A1 Mar. 11, 2004

(30) Foreign Application Priority Data

May 23, 2002 (JP) ............................ 2002-149543

(51) Int. Cl.
*G03B 21/26* (2006.01)
*G03B 21/00* (2006.01)
*G03B 21/14* (2006.01)
*G05B 19/18* (2006.01)
*G02B 27/22* (2006.01)

(52) U.S. Cl. ............................ 353/94; 353/7; 353/70; 700/59; 359/462

(58) Field of Classification Search .................... 353/7, 353/70, 94; 345/418, 744; 348/744; 700/59; 358/518; 359/462
See application file for complete search history.

(56) References Cited

U.S. PATENT DOCUMENTS 5,125,733 A * 6/1992 Lee ............................ 353/7
5,422,693 A 6/1995 Vogeley et al. ............ 353/122
5,537,169 A * 7/1996 Park ............................ 353/101
5,669,690 A * 9/1997 Hodson et al. ............ 353/122
6,538,742 B1 * 3/2003 Ohsawa ...................... 356/405
6,633,302 B1 * 10/2003 Ohsawa et al. ............ 345/604
2001/0024231 A1 * 9/2001 Nakamura et al. ............ 348/58
2003/0137610 A1 * 7/2003 Ohsawa ...................... 348/744
2004/0017379 A1 * 1/2004 Ajito et al. ................ 345/600

FOREIGN PATENT DOCUMENTS

JP 09-172649 A 6/1997
JP 11-096333 A 4/1999
JP 2000-253263 A 9/2000
JP 2000-338950 A 12/2000
JP 2001-272727 A 10/2001

OTHER PUBLICATIONS

Fairchild, Mark D., "Color Appearance Models" published by Addison Wesley Longman, Inc., Reading, MA, USA 1998. Chapters 9-14.

* cited by examiner

*Primary Examiner*—Judy Nguyen
*Assistant Examiner*—Magda Cruz
(74) *Attorney, Agent, or Firm*—Firshauf, Holtz, Goodman & Chick, P.C.

(57) ABSTRACT

An image display apparatus is provided which includes a screen and a plurality of projectors which respectively project images relating to a same object so that the images are superimposed on each other on the screen. One of the plurality of projectors is arranged spatially in substantially a plane symmetric relationship with another of the plurality of projectors so that the images are projected at projectors angles onto the screen to be substantially in alignment on the screen.

11 Claims, 14 Drawing Sheets

IMAGE DISPLAY APPARATUS FOR DISPLAYING SUPERIMPOSED IMAGES FROM A PLURALITY OF PROJECTORS

This application claims the benefit of Japanese Application No. 2002-149543 filed in Japan on May 23, 2002, the entire contents of which are incorporated herein by reference.

BACKGROUND OF THE INVENTION

1. Field of the Invention

The present invention relates to image display apparatuses and, more particularly, to an image display apparatus which projects images relating to the same object onto a screen, and which superimposes the images on the screen using a plurality of projectors.

2. Description of the Related Art

Color management systems (CMSs) that perform color matching of input and output images among a plurality of color image apparatuses such as a color CRT monitor or a color printer are prevailing in a variety of fields that handle color images.

It is known that if a color based on the same tristimulus values XYZ is viewed under different illumination conditions, the color looks different depending on a variation in sense characteristics of humans such as a chromatic adaptation. In the above-mentioned system, the same problem is presented when a reproduced image is viewed under a different illumination condition.

The tristimulus values XYZ are quantitative values defined by the International Commission on Illumination (CIE), and guarantee that a color looks the same under the same illumination conditions. The tristimulus values XYZ cannot be applied to the case where the same color is viewed under different illumination conditions.

To overcome this drawback, the conventional CMS uses a human color perception model such as a chromatic adaptation to reproduce colors that correspond to the tristimulus values, which are viewed the same under different environments. As discussed in the book entitled "Color Appearance Models" by Mark D. Fairchild (Addison Wesley (1998)), several models have been proposed. Studies have been made to establish a model that permits a more precise color prediction. different from the one used during the photographing operation, a spectral reflectivity image of the subject is estimated. The estimated spectral reflectivity image is then multiplied by an illumination spectrum at a viewing side to result in tristimulus values under the viewing illumination, and then the color is reproduced. Since such a technique of illumination conversion is designed to reproduce the tristimulus values when the subject is present under the viewing illumination, precise color appearance is obtained without paying attention to a vision characteristic of humans such as color adaptation.

In one type of image display apparatus, a projection optical system projects an image presented on a display device such as an LCD to a screen by illuminating the display device with light from a light source. A variety of such models have been proposed and are commercially available.

In this type of image display apparatus, a diversity of techniques are introduced to improve the quality of displayed images. For example, in some commercially available and relatively high-end image display apparatuses, identical images, projected by a plurality of projectors, are superimposed on a screen to heighten luminance of the displayed images.

Even for the above mentioned image display apparatus, it is desired to present high-quality images such as an image with a high color reproducibility, a high luminance image, or a stereo-vision image without introducing any particularly complex and costly arrangement.

SUMMARY OF THE INVENTION

It is an object of the present invention to provide an image display apparatus which displays a high-quality image with a relatively low-cost arrangement.

An image display apparatus is provided which includes a screen and a plurality of projectors which respectively project images relating to a same object so that the images are superimposed on each other on the screen. One of the plurality of projectors is arranged spatially in substantially a plane symmetric relationship with another of the plurality of projectors so that the images are projected at elevation angles onto the screen to be substantially in alignment on the screen.

The above and other objects, features and advantages of the invention will become more clearly understood from the following description referring to the accompanying drawings.

DESCRIPTION OF THE PREFERRED EMBODIMENTS

Figure 1:
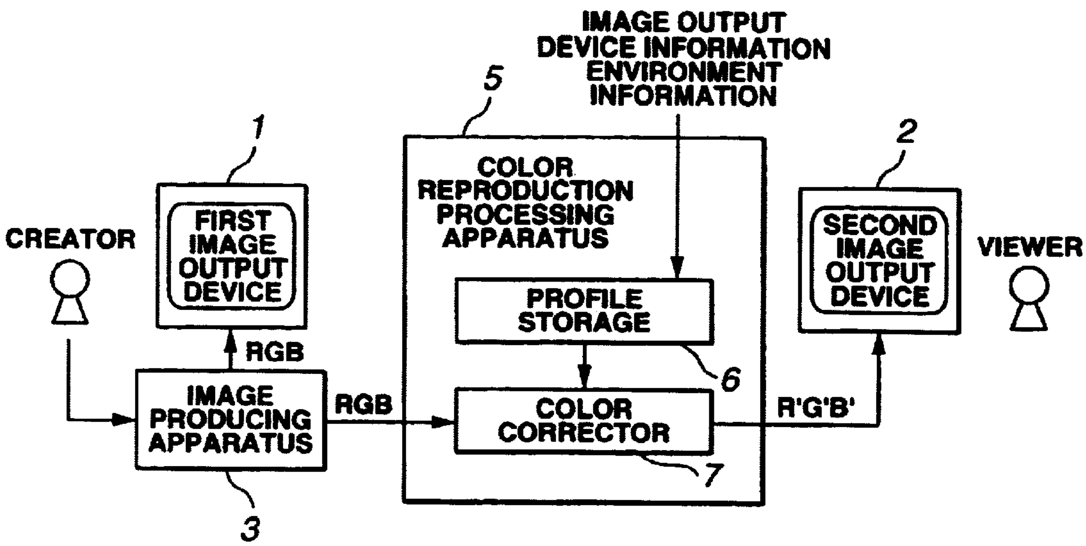
FIG. 1 is a block diagram showing the structure of a color reproducing apparatus in accordance with a first embodiment of the present invention.

The embodiments of the present invention will now be discussed with reference to the drawings.

Before specifically discussing the embodiments of the present invention, the principle of color reproduction used in the present invention is discussed first.

The principle of color reproduction is used to estimate a spectral reflectivity of an object that has been produced, using a signal value input to an image output device when a creator produces an image of the object, information relating to the image output device of a production phase, spectral information of illumination of the production phase, and information relating to a vision characteristic of the creator.

Taking the image output device as an example of a monitor that displays a color image by supplying a signal to RGB phosphor materials, means to estimate a spectral reflectivity of an object based on a signal value (RGB values) supplied to the RGB phosphorus materials is explained now.

When the RGB values are supplied to the monitor, the RGB values are non-linearly converted using γ characteristics of the monitor. Let $\gamma_R[R]$, $\gamma_G[G]$, and $\gamma_B[B]$ represent the RGB γ characteristics, respectively.

An emission from the monitor is the sum of emissions of the RGB phosphor materials. Thus, the sum of an emission responsive to the RGB values converted through the γ characteristics and bias light of the monitor becomes spectral light P(λ) from the monitor. The spectral light P(λ) is expressed in equation 1.

$$P(\lambda)=\gamma_R[R]\cdot P_R(\lambda)+\gamma_G[G]\cdot P_G(\lambda)+\gamma_B[B]\cdot P_B(\lambda)+b(\lambda) \quad \text{[Equation 1]}$$

where $P_R(\lambda)$, $P_G(\lambda)$, and $P_B(\lambda)$ respectively represent spectra of the R, G, and B phosphor materials in the maximum emission intensities thereof, and b(λ) represents a spectrum of the bias light.

Tristimulus values (XYZ values) which a creator feels as a color in response to the spectrum of the emission from the monitor are expressed in equation 2 using color matching functions x(λ), y(λ), and z(λ).

$$\begin{pmatrix} X \\ Y \\ Z \end{pmatrix} = \begin{pmatrix} \int P(\lambda)x(\lambda)d\lambda \\ \int P(\lambda)y(\lambda)d\lambda \\ \int P(\lambda)z(\lambda)d\lambda \end{pmatrix} = \begin{pmatrix} \int P_R(\lambda)x(\lambda)d\lambda & \int P_G(\lambda)x(\lambda)d\lambda & \int P_B(\lambda)x(\lambda)d\lambda \\ \int P_R(\lambda)y(\lambda)d\lambda & \int P_G(\lambda)y(\lambda)d\lambda & \int P_B(\lambda)y(\lambda)d\lambda \\ \int P_R(\lambda)z(\lambda)d\lambda & \int P_G(\lambda)z(\lambda)d\lambda & \int P_B(\lambda)z(\lambda)d\lambda \end{pmatrix} \begin{pmatrix} \gamma_R[R] \\ \gamma_G[G] \\ \gamma_B[B] \end{pmatrix} + \begin{pmatrix} \int b(\lambda)x(\lambda)d\lambda \\ \int b(\lambda)y(\lambda)d\lambda \\ \int b(\lambda)z(\lambda)d\lambda \end{pmatrix} \quad \text{[Equation 2]}$$

Equation (2) is rewritten into equation 3 using matrices.

$$t=Mp+b \quad \text{[Equation 3]}$$

where $$t=(XYZ)^T \quad \text{[Equation 4]}$$

$$M = \begin{pmatrix} \int P_R(\lambda)x(\lambda)d\lambda & \int P_G(\lambda)x(\lambda)d\lambda & \int P_B(\lambda)x(\lambda)d\lambda \\ \int P_R(\lambda)y(\lambda)d\lambda & \int P_G(\lambda)y(\lambda)d\lambda & \int P_B(\lambda)y(\lambda)d\lambda \\ \int P_R(\lambda)z(\lambda)d\lambda & \int P_G(\lambda)z(\lambda)d\lambda & \int P_B(\lambda)z(\lambda)d\lambda \end{pmatrix} \quad \text{[Equation 5]}$$

$$p=(\gamma_R[R]\gamma_G[G]\gamma_B[B])^T \quad \text{[Equation 6]}$$

$$b=(\int b(\lambda)x(\lambda)d\lambda \int b(\lambda)y(\lambda)d\lambda \int b(\lambda)z(\lambda)d\lambda)^T \quad \text{[Equation 7]}$$

where superscript "T" represents the transpose of the matrix.

Let f(λ) represent a spectral reflectivity of the object intended by the creator, and $E_0(\lambda)$ represent an illumination spectrum of a production phase. When the object f(λ) is present under illumination $E_0(\lambda)$, the color of the object which the creator actually perceives is expressed by tristimulus values X', Y' and Z' of equation (8).

$$\begin{pmatrix} X' \\ Y' \\ Z' \end{pmatrix} = \begin{pmatrix} \int E_0(\lambda)f(\lambda)x(\lambda)d\lambda \\ \int E_0(\lambda)f(\lambda)y(\lambda)d\lambda \\ \int E_0(\lambda)f(\lambda)z(\lambda)d\lambda \end{pmatrix} \quad \text{[Equation 8]}$$

If the spectral reflectivity f(λ) of the object has a statistical feature that is expandable using three basis functions $e_l(\lambda)$ (l=1, . . . , 3), the spectral reflectivity f(λ) is expressed using equation 9.

$$f(\lambda)=\sum_{l=1}^{3} c_l e_l(\lambda) \quad \text{[Equation 9]}$$

Equation 8 is rewritten into the following equation 10.

[Equation 10]

$$\begin{pmatrix} X' \\ Y' \\ Z' \end{pmatrix} = \begin{pmatrix} \int E_0(\lambda)e_1(\lambda)x(\lambda)d\lambda & \int E_0(\lambda)e_2(\lambda)x(\lambda)d\lambda & \int E_0(\lambda)e_3(\lambda)x(\lambda)d\lambda \\ \int E_0(\lambda)e_1(\lambda)y(\lambda)d\lambda & \int E_0(\lambda)e_2(\lambda)y(\lambda)d\lambda & \int E_0(\lambda)e_3(\lambda)y(\lambda)d\lambda \\ \int E_0(\lambda)e_1(\lambda)z(\lambda)d\lambda & \int E_0(\lambda)e_2(\lambda)z(\lambda)d\lambda & \int E_0(\lambda)e_3(\lambda)z(\lambda)d\lambda \end{pmatrix} \begin{pmatrix} c_1 \\ c_2 \\ c_3 \end{pmatrix}$$

During an image production process, the creator adjusts the signal value to the signal output device such that the tristimulus values expressed in equation 10 are obtained.

Equation 11 holds if the tristimulus values expressed in equation 10 coincide with the tristimulus values expressed in equation 2.

$$t=Vc \quad \text{[Equation 11]}$$

where

[Equation 12]

$$V = \begin{pmatrix} \int E_0(\lambda)e_1(\lambda)x(\lambda)d\lambda & \int E_0(\lambda)e_2(\lambda)x(\lambda)d\lambda & \int E_0(\lambda)e_3(\lambda)x(\lambda)d\lambda \\ \int E_0(\lambda)e_1(\lambda)y(\lambda)d\lambda & \int E_0(\lambda)e_2(\lambda)y(\lambda)d\lambda & \int E_0(\lambda)e_3(\lambda)y(\lambda)d\lambda \\ \int E_0(\lambda)e_1(\lambda)z(\lambda)d\lambda & \int E_0(\lambda)e_2(\lambda)z(\lambda)d\lambda & \int E_0(\lambda)e_3(\lambda)z(\lambda)d\lambda \end{pmatrix}$$

$$c=(c_1 c_2 c_3)^T \quad \text{[Equation 13]}$$

From equation 11, estimated values of expansion coefficients $c_l$ (l=1, . . . , 3) in each basis function of the spectral reflectivity of the subject are expressed by equation 14.

$$c=V^{-1}t \quad \text{[Equation 14]}$$

The tristimulus values t of the object are determined from the image signal value p provided by the creator in accordance with equation 3, and coefficients c are determined in accordance with equation 14. The spectral reflectivity f(λ) of the object is thus determined by using the determined coefficients c on equation 9.

The embodiments of the present invention will now be specifically discussed with reference to the drawings.

FIGS. 1 through 5 show a first embodiment of the present invention. FIG. 1 is a block diagram showing the structure of the color reproducing apparatus in accordance with the first embodiment of the present invention.

As shown in FIG. 1, the color reproducing apparatus includes an image producing apparatus 3 on which a creator adjusts to produce a color image, a first image output device 1 which receives RGB signals constituting an original image produced by the image producing apparatus 3 and which provides an image output, a color reproduction processing apparatus 5 which corrects the color of the image in accordance with the RGB signals produced by the image producing apparatus 3, and a second image output device 2 which performs an image output such that the image can be viewable to a viewer based on R', G', and B' signals which are a view image corrected by the color reproduction processing apparatus 5.

The color reproduction processing apparatus 5 includes: a profile storage 6 as profile storage means for receiving from the outside and storing image output device information of a production phase, environment information relating to a color reproduction environment of the production phase, image output device information of a view phase, and environment information relating to a color reproduction environment of the view phase; and a color corrector 7 as color correction means for correcting the color of an image based on data output from the profile storage 6 and the RGB signals output from the image producing apparatus 3.

The first embodiment as shown in FIG. 1 is based on the assumption that the image output device used during the view phase is different from the image output device used during the production phase, and that the viewer is different from the creator. The present invention is not limited to this arrangement. The present invention may be configured as shown in FIG. 2.

Figure 2:
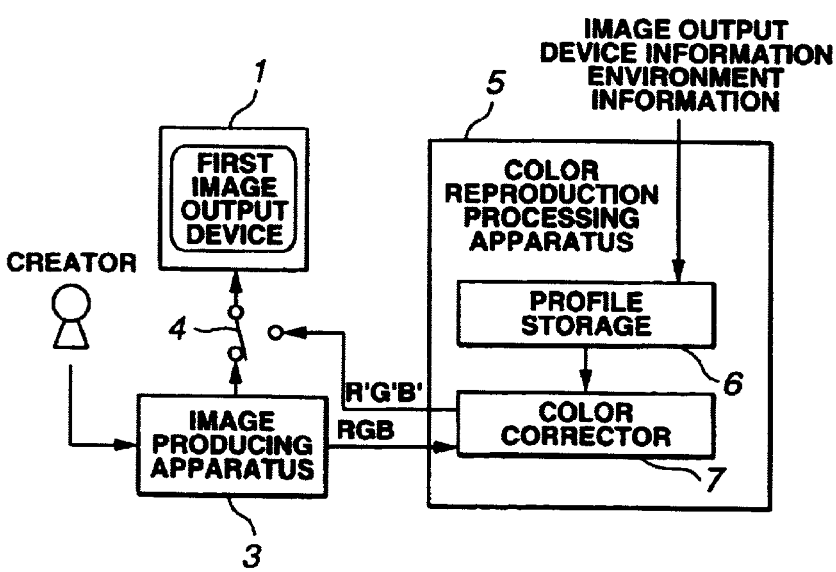
FIG. 2 is a block diagram showing another example of the structure of the color reproducing apparatus in accordance with the first embodiment of the present invention.

FIG. 2 is a block diagram showing another example of the structure of the color reproducing apparatus.

As shown in FIG. 2, the image output device to be used during the view phase may be the same as the first image output device 1 which has been used during the production phase. The viewer and the creator may be the same person. In this case as shown in FIG. 2, a switch 4 may be operated such that the RGB signals output from the image producing apparatus 3 are directly input to the first image output device 1 during the production phase, and such that the R', G', and B' signals processed by the color reproduction processing apparatus 5 are input to the first image output device 1 during the view phase.

The arrangement shown in FIG. 2 may be applied in a simulation of how an object indicated by a produced image is observed under a different illumination, for example.

The color reproduction processing apparatus 5 in the first embodiment receives the RGB signals from the image producing apparatus 3, performs color correction on the RGB signals, and then outputs the color corrected RGB signals. The present invention is not limited to the processing of the three RGB primary colors. Multi primary colors in addition to the three primary colors may be input and output, or a monochrome image may be input.

Figure 3:
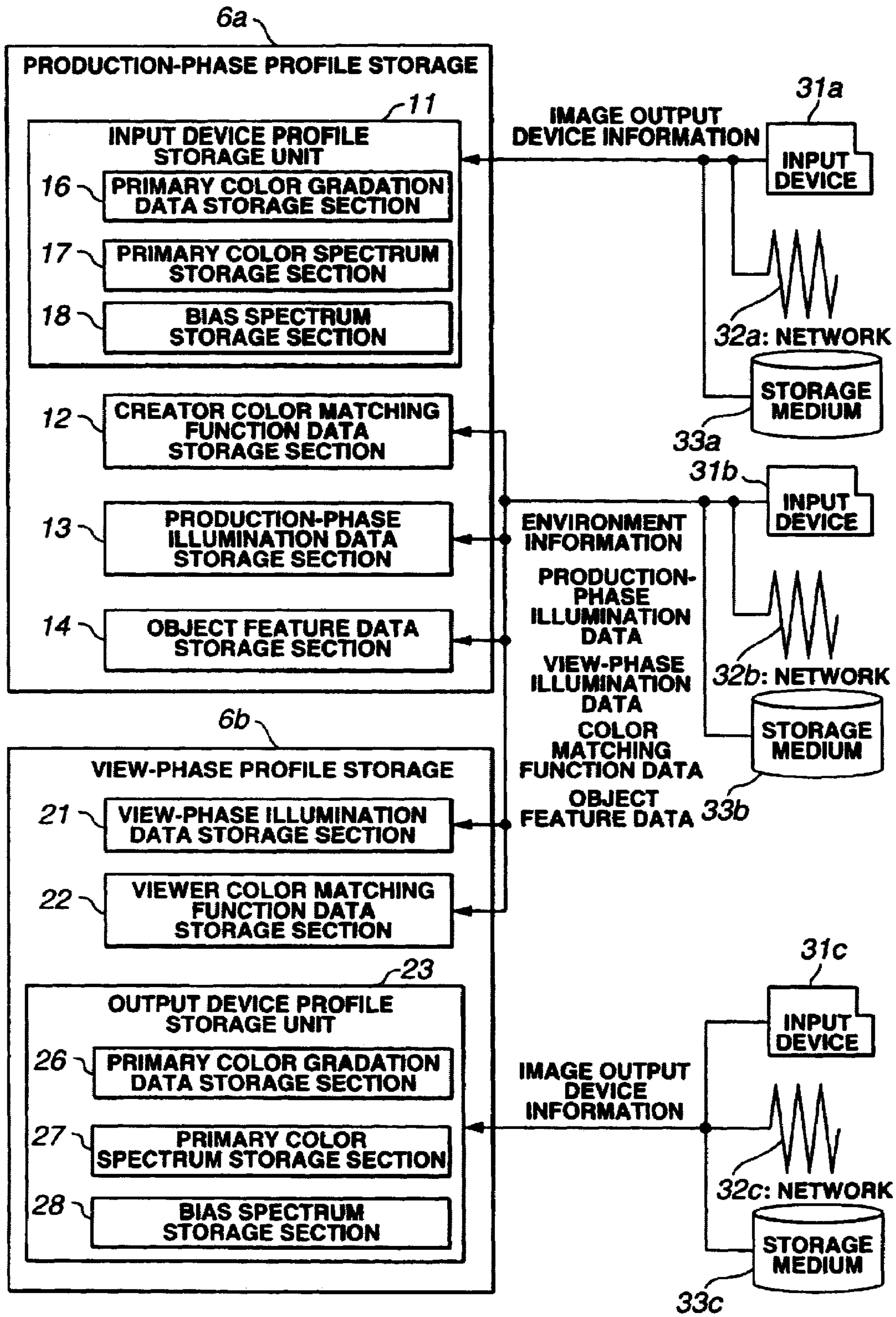
FIG. 3 is a block diagram showing the structure of a profile storage in accordance with the first embodiment of the present invention.

The structure of the profile storage 6 in the color reproduction processing apparatus 5 will be discussed in detail with reference to FIG. 3. FIG. 3 is a block diagram showing the structure of the profile storage 6.

The profile storage 6 includes, as the major components thereof; a production-phase profile storage 6a for storing image output device information of the production phase, and environment information relating to a color reproduction environment of the production phase; and a view-phase profile storage 6b for storing image output device information of a view phase, and environment information relating to a color reproduction environment of the view phase.

The production-phase profile storage 6a includes an input device profile storage unit 11, a creator color matching function data storage section 12, a production-phase illumination data storage section 13, and an object characteristic data storage section 14. The input device profile storage unit 11 includes a primary color gradation data storage section 16, a primary color spectrum storage section 17, and a bias spectrum storage section 18.

The view-phase profile storage 6*b* includes a view-phase illumination data storage section 21, a viewer color matching function data storage section 22, and an output device profile storage unit 23. The output device profile storage unit 23 includes a primary color gradation storage section 26, a primary color spectrum storage section 27, and a bias spectrum storage section 28.

The input device profile storage unit 11 receives the image output device information of the production phase from a dedicated input device 31*a*, a network 32*a*, and a storage medium 33*a*.

The image output device information of the production phase contains spectrum data of the RGB primary colors at the maximum power values thereof used in the first image output device 1 during the production phase (hereinafter referred to as primary color spectrum data), spectrum data of a bias component appearing on a screen with no signal output (hereinafter referred to as bias spectrum data), and characteristic data of output signal strength of each of the RGB primary colors in response to an input signal value of each of RGB input signals (hereinafter referred to as RGB gradation characteristic data). The primary color spectrum data, the bias spectrum data, and the RGB gradation characteristic data are stored in the primary color spectrum storage section 17, the bias spectrum storage section 18, and the primary color gradation data storage section 16, respectively.

The output device profile storage unit 23 receives the image output device information of the view phase from a dedicated input device 31*c*, a network 32*c*, and a storage medium 33*c*.

Likewise, the image output device information of the view phase contains spectrum data of the RGB primary colors at the maximum power values thereof used in the second image output device 2 during the view phase (hereinafter referred to as primary color spectrum data), spectrum data of a bias component appearing on a screen with no signal output (hereinafter referred to as bias spectrum data), and characteristic data of output signal strength of each of the RGB primary colors in response to an input signal value of each of RGB input signals (hereinafter referred to as RGB gradation characteristic data). The primary color spectrum data, the bias spectrum data, and the RGB gradation characteristic data are stored in the primary color spectrum storage section 27, the bias spectrum storage section 28, and the primary color gradation data storage section 26, respectively.

Environment information is input from each of a dedicated input device 31*b*, a network 32*b*, and a storage medium 33*b* to each of the creator color matching function data storage section 12, the production-phase illumination data storage section 13, the object characteristic data storage section 14, the view-phase illumination data storage section 21, and the viewer color matching function data storage section 22.

Specifically, the environment information contains spectrum data of illumination during the production phase of the image of the object (hereinafter referred to as production-phase illumination data), spectrum data of illumination under which the viewer desires to view the object (hereinafter referred to as view-phase illumination data), color matching function data which is a vision characteristic of the creator responsive to color, color matching function data which is a vision characteristic of the viewer responsive to color, and information representing a statistical feature relating to a spectrum such as a basis function of the produced object (hereinafter referred to as object characteristic data). The production-phase illumination data, the view-phase illumination data, the creator color matching function data, the viewer color matching function data, and the object characteristic data are stored in the production-phase illumination data storage section 13, the view-phase illumination data storage section 21, the creator color matching function data storage section 12, the viewer color matching function data storage section 22, and the object characteristic data storage section 14, respectively.

The production-phase illumination data is used to cancel the effect of illumination used during the production phase. Specifically, an environment-independent spectral reflectivity of the object itself is estimated from the image of the object which is produced under any visible light illumination (for example, under fluorescent light, incandescent lighting, sunlight), by using the production-phase illumination data, the image output device information of the production phase, and the color matching function data.

The view-phase illumination data is used together with the spectral reflectivity to calculate the color of the object under the illumination where the viewer actually desires to view the image.

The production-phase illumination data and the view-phase illumination data may be respective pieces of spectrum data that are obtained by measuring ambient illumination with spectrum detection sensors during the production phase and the view phase of the image, or may be likely spectrum data which are selected from spectrum sample data of a variety of illuminations registered beforehand in a database or the like, respectively by the creator during the production phase of the image or by the viewer during the view phase of the image.

The object characteristic data is used to estimate a color image reproduced with precision even when the amount of spectral information of an input image is small.

Both the creator color matching function data and the viewer color matching function data may be standardized color matching functions such as the XYZ color matching functions standardized by the International Commission on Illumination (CIE), or may be color matching functions appropriate for each individual measured beforehand or estimated beforehand. If the color matching function appropriate for each individual is used, color is reproduced with a higher precision because color reproduction accounting for a difference between the vision characteristics of the creator and the viewer is carried out.

The image output device information and the environment information are supplied from each of the dedicated input devices 31*a*, 31*b*, and 31*c*, each of the networks 32*a*, 32*b*, and 32*c*, or each of the storage media 33*a*, 33*b*, and 33*c*. If the image output device information and the environment information are supplied from one of the input devices 31*a*, 31*b*, and 31*c*, the environment information during the production phase and the environment information under which the viewer desires to view the image are acquired on a real-time basis. This arrangement offers the advantage that information required to reproduce color is acquired with precision even when the environment changes momently.

When the image output device information and the environment information are acquired from each of the networks 32*a*, 32*b*, and 32*c*, or each of the storage media 33*a*, 33*b*, and 33*c*, data acquisition may be advantageously performed in accordance with an environment at a remote place or an environment used in the past. In this case, the use of a database allows the user to select and acquire data from sample data stored beforehand. This arrangement accumulates data, thereby heightening precision in color reproduction.

The structure and process flow of the color corrector 7 in the color reproduction processing apparatus 5 will now be discussed with reference to FIGS. 4 and 5.

Figure 4:
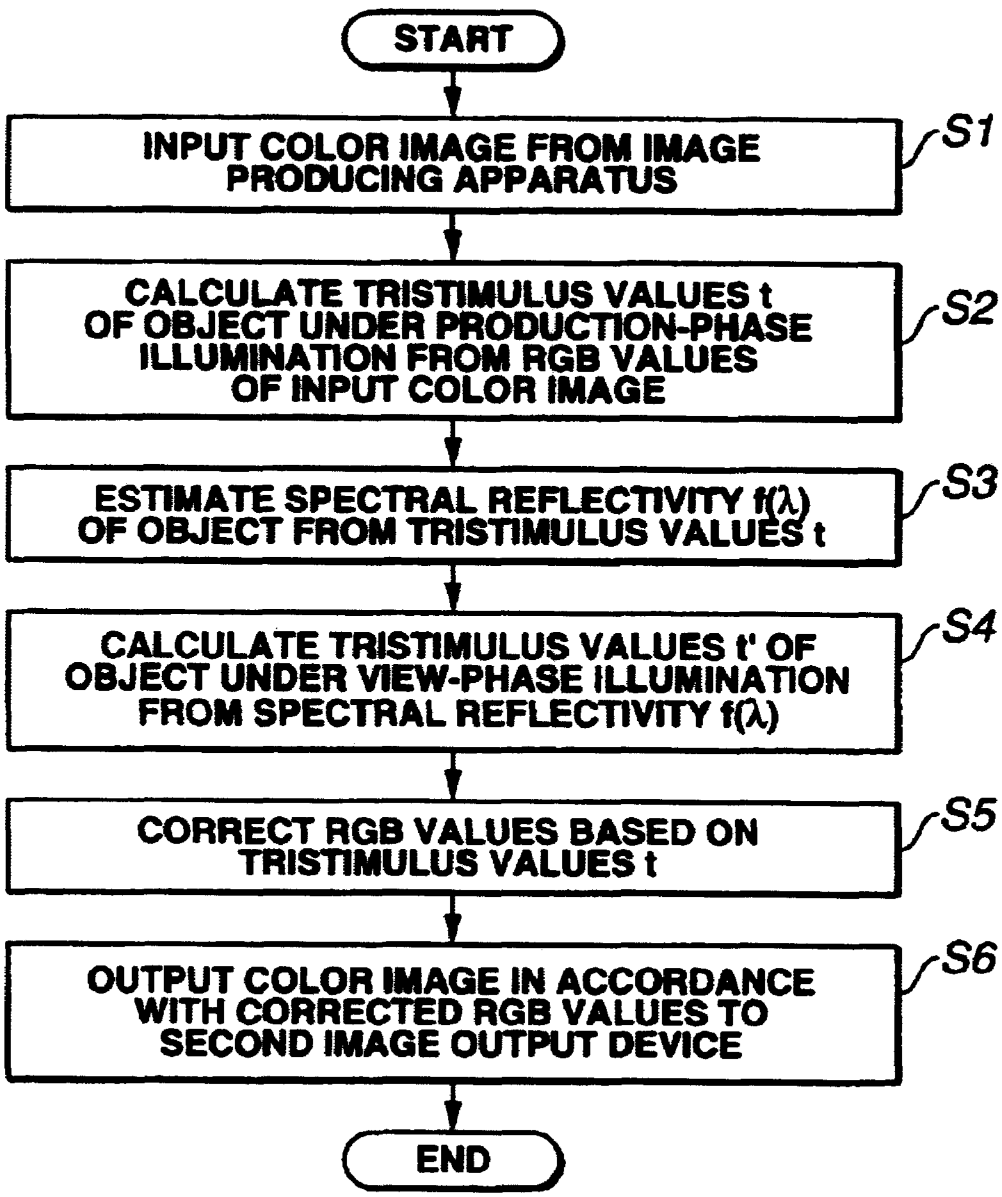
FIG. 4 is a flow diagram showing a process performed by a color corrector in the color reproducing apparatus in accordance with the first embodiment of the present invention.

FIG. 4 is a flow diagram showing a process performed by the color corrector 7 in the color reproduction processing apparatus 5.

At the beginning of the process flow, the color corrector 7 receives a color image produced by the image producing apparatus 3, thereby reading RGB values (step S1). Based on the image output device information of the production phase stored in the production-phase profile storage 6*a*, the color corrector 7 calculates tristimulus values t of an object under an illumination of the production phase from the RGB values (step S2).

The color corrector 7 estimates a spectral reflectivity f(λ) of the object from the calculated tristimulus values t, in accordance with the production-phase illumination data, the creator color matching function data, and the object characteristic data, stored in the production-phase profile storage 6*a* (step S3).

The color corrector 7 calculates the tristimulus values t' of the object under the illumination of the view phase from the estimated spectral reflectivity f(λ), in accordance with the view-phase illumination data and the viewer color matching function data, stored in the view-phase profile storage 6*b* (step S4).

Finally, the color corrector 7 calculates the RGB values from the tristimulus values t' of the object, in accordance with the image device output information of the view phase stored in the view-phase profile storage 6*b* (step S5). The calculated RGB values are output to the second image output device 2 as R'G'B' values (step S6). The color image of the object is thus presented on the second image output device 2.

Figure 5:
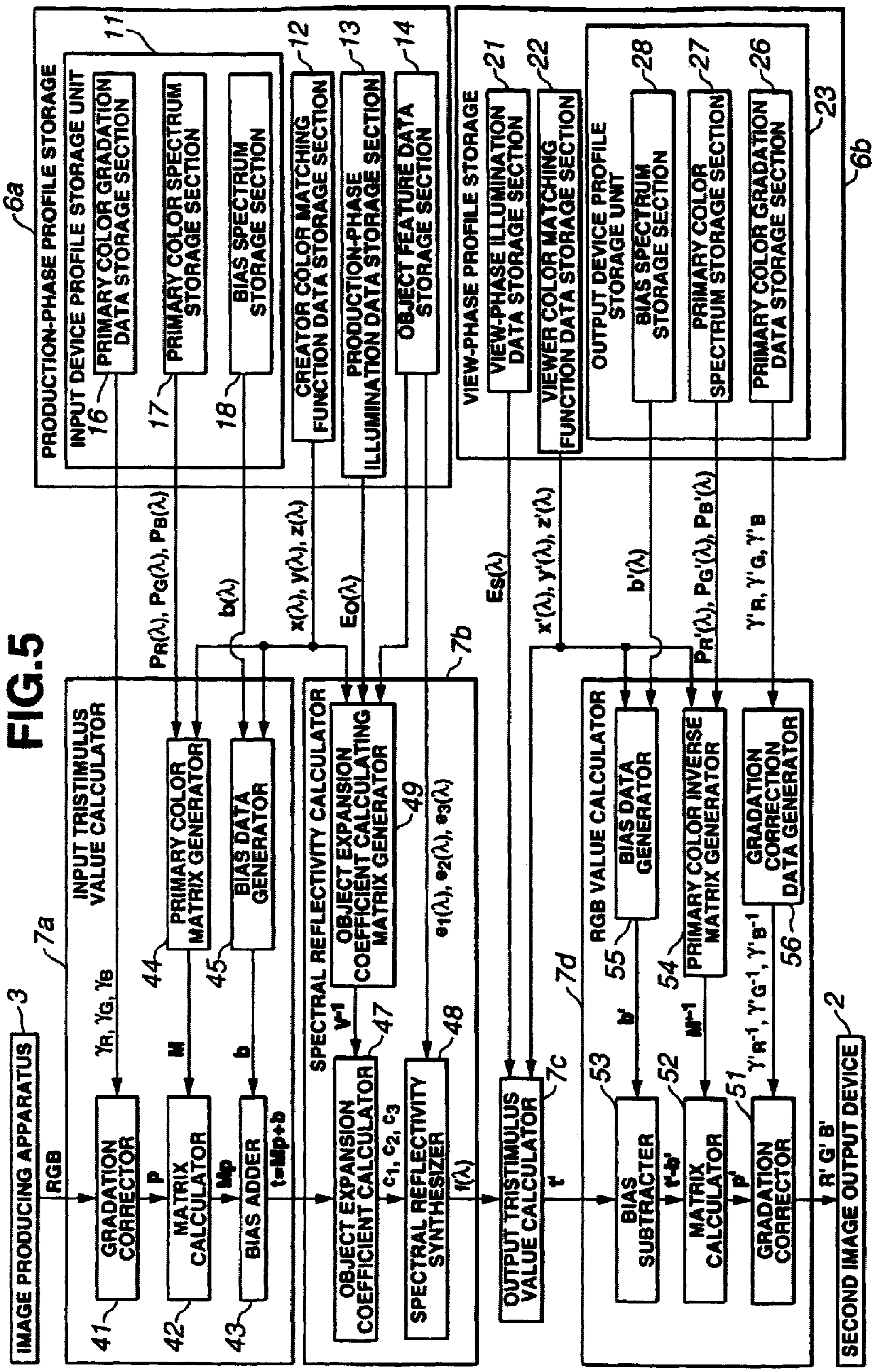
FIG. 5 is a block diagram showing the structure of the color reproducing apparatus in accordance with the first embodiment of the present invention.

FIG. 5 is a block diagram showing the structure of the color reproduction processing apparatus 5.

The profile storage 6 in the color reproduction processing apparatus 5 has already been discussed with reference to FIG. 3.

As shown in FIG. 5, the color corrector 7 in the color reproduction processing apparatus 5 includes, as the major elements thereof, an input tristimulus value calculator 7*a*, a spectral reflectivity calculator 7*b*, an output tristimulus value calculator 7*c*, and an RGB value calculator 7*d*.

Specifically, the input tristimulus value calculator 7*a* includes a primary color matrix generator 44, a bias data generator 45, a gradation corrector 41, a matrix calculator 42, and a bias adder 43.

The primary color matrix generator 44 organizes the tristimulus values XYZ of each of the RGB primary colors in the first image output device 1 into a matrix M of three rows by three columns (3×3), based on the primary color spectrum data $P_R(\lambda)$, $P_G(\lambda)$ and $P_B(\lambda)$ stored in the primary color spectrum storage section 17 in the production-phase profile storage 6*a*, and the creator color matching function data x(λ), y(λ), and z(λ) stored in the creator color matching function data storage section 12.

The bias data generator 45 generates the XYZ tristimulus value data b of a bias component in the first image output device 1, based on the bias spectrum data b(λ) stored in the bias spectrum storage section 18 in the production-phase profile storage 6*a*, and the creator color matching function data x(λ), y(λ), and z(λ) stored in the creator color matching function data storage section 12.

In the input tristimulus value calculator 7*a*, the gradation corrector 41 corrects gradation based on the RGB values output from the image producing apparatus 3, and γ curves $\gamma_R[R]$, $\gamma_G[G]$, and $\gamma_B[B]$ stored in the primary color gradation data storage section 16. The gradation corrector 41 then outputs a vector p representing corrected spectrum light.

The matrix calculator 42 performs a matrix calculation based on the vector p as a result of correction by the gradation corrector 41, and the primary color matrix data M generated by the primary color matrix generator 44, and outputs Mp as a result.

The bias adder 43 adds the tristimulus value data b of the bias component generated by the bias data generator 45 to the tristimulus value Mp calculated by the matrix calculator 42, thereby resulting in the production-phase tristimulus values t of the object. The tristimulus values t are then output to the spectral reflectivity calculator 7*b*.

The spectral reflectivity calculator 7*b* includes an object expansion coefficient calculator 47, a spectral reflectivity synthesizer 48, and an object expansion coefficient calculating matrix generator 49.

The object expansion coefficient calculating matrix generator 49 generates a matrix $V^{-1}$ for estimating expansion coefficients $c_l$ (l=1, . . . , 3) of the object, based on the creator color matching function data x(λ), y(λ), and z(λ) stored in the creator color matching function data storage section 12 in the production-phase profile storage 6*a*, the spectrum data $E_0(\lambda)$ of the production phase stored in the production-phase illumination data storage section 13, and the basis function data $e_l(\lambda)$ (l=1, . . . , 3) of the object stored in the object characteristic data storage section 14.

The object expansion coefficient calculator 47 calculates the expansion coefficient $c_l$ (l=1, . . . , 3) of the object using the matrix $V^{-1}$ generated by the object expansion coefficient calculating matrix generator 49 in accordance with the tristimulus values t of the object of the production phase calculated by the input tristimulus value calculator 7*a*.

The spectral reflectivity synthesizer 48 synthesizes the spectral reflectivity f(λ) of the object based on the estimated object expansion coefficient $c_l$ (l=1, . . . , 3) and the basis function data $e_l(\lambda)$ (l=1, . . . , 3) of the object stored in the object characteristic data storage section 14.

The output tristimulus value calculator 7*c* calculates the XYZ tristimulus values t' of the object under the view-phase illumination, based on the spectral reflectivity f(λ) of the object calculated by the spectral reflectivity calculator 7*b*, spectrum data $E_s(\lambda)$ of the view-phase illumination stored in the view-phase illumination data storage section 21 in the view-phase profile storage 6*b*, and the viewer color matching function data x'(λ), y'(λ), and z'(λ) stored in the viewer color matching function data storage section 22. The calculated XYZ tristimulus values t' are output to the RGB value calculator 7*d*.

Specifically, the RGB value calculator 7*d* includes a gradation corrector 51, a matrix calculator 52, a bias subtracter 53, a primary color inverse matrix generator 54, a bias data generator 55, and a gradation correction data generator 56.

The bias data generator 55 calculates XYZ tristimulus value data b' of a bias component in the second image output, device 2, based on bias spectrum data b'(λ) of the second image output device 2 stored in the bias spectrum storage section 28 in the view-phase profile storage 6*b*, and the viewer color matching function data x'(λ), y'(λ), and z'(λ) stored in the viewer color matching function data storage section 22.

The primary color inverse matrix generator 54 calculates the XYZ tristimulus values of the RGB primary colors as a 3×3 matrix M', based on primary color spectrum data $P_R'(\lambda)$, $P_G'(\lambda)$ and $P_B'(\lambda)$ of the second image output device 2 stored in the primary color spectrum storage section 27 in the view-phase profile storage 6*b*, and the viewer color matching function data x'(λ), y'(λ), and z'(λ) stored in the viewer color matching function data storage section 22. The primary color inverse matrix generator 54 produces an inverse matrix $M'^{-1}$ of the 3×3 matrix M', and then outputs the inverse matrix $M'^{-1}$ to the matrix calculator 52.

The gradation correction data generator 56 calculates an inverse version of characteristic data $\gamma'_R[R]$, $\gamma'_G[G]$, and $\gamma'_B[B]$ of each primary color in the second image output device 2 stored in the primary color gradation storage section 26 in the view-phase profile storage 6*b*, namely, characteristic data $\gamma'_R{}^{-1}[R]$, $\gamma'_G{}^{-1}[G]$, and $\gamma'_B{}^{-1}[B]$ of an input signal value corresponding to an output intensity of each primary color, and outputs the characteristic data $\gamma'_R{}^{-1}[R]$, $\gamma'_G{}^{-1}[G]$, and $\gamma'_B{}^{-1}[B]$ to the gradation corrector 51.

The bias subtracter 53 in the RGB value calculator 7*d* subtracts the tristimulus value data b' of the bias component generated by the bias data generator 55 from the tristimulus values t' output from the output tristimulus value calculator 7*c*.

The matrix calculator 52 performs a matrix calculation on the result of subtraction operation of the bias subtracter 53 and the inverse matrix $M'^{-1}$ generated by the primary color inverse matrix generator 54.

The gradation corrector 51 performs gradation correction on the result p' provided by the matrix calculator 52 with inverse characteristic data $\gamma'_R{}^{-1}[R]$, $\gamma'_G{}^{-1}[G]$, and $\gamma'_B{}^{-1}[B]$ of the gamma curves stored in a gradation correction data storage section, thereby converting the result p' into RGB values.

The RGB values calculated by the RGB value calculator 7*d* are supplied to the second image output device 2 as R', G' B' values. A color image of the object is thus presented on the second image output device 2.

The word "environment" has a broad sense, and includes factors in a wide range affecting color. The word environment includes not only spectrum of illumination, but also color matching functions and features of the object (basis functions).

The image output devices include a display device such as a monitor. But not limited to this, the image output device may be a printer.

In accordance with such the first embodiment image conversion is performed referencing the information relating to the image output devices of the production phase and the view phase, the spectrum information of the illuminations of the production phase and the view phase, and the color reproduction environment information containing the vision characteristic data of the creator and the viewer and the spectrum statistical data of the object in the produced image. The location where the image is produced may be set to be remote from the location where the image is viewed.

Even if the color image produced by the image producing apparatus is reproduced under an environment different from that of the production phase, the color of the object intended by the creator is reproduced with precision.

Figure 6:
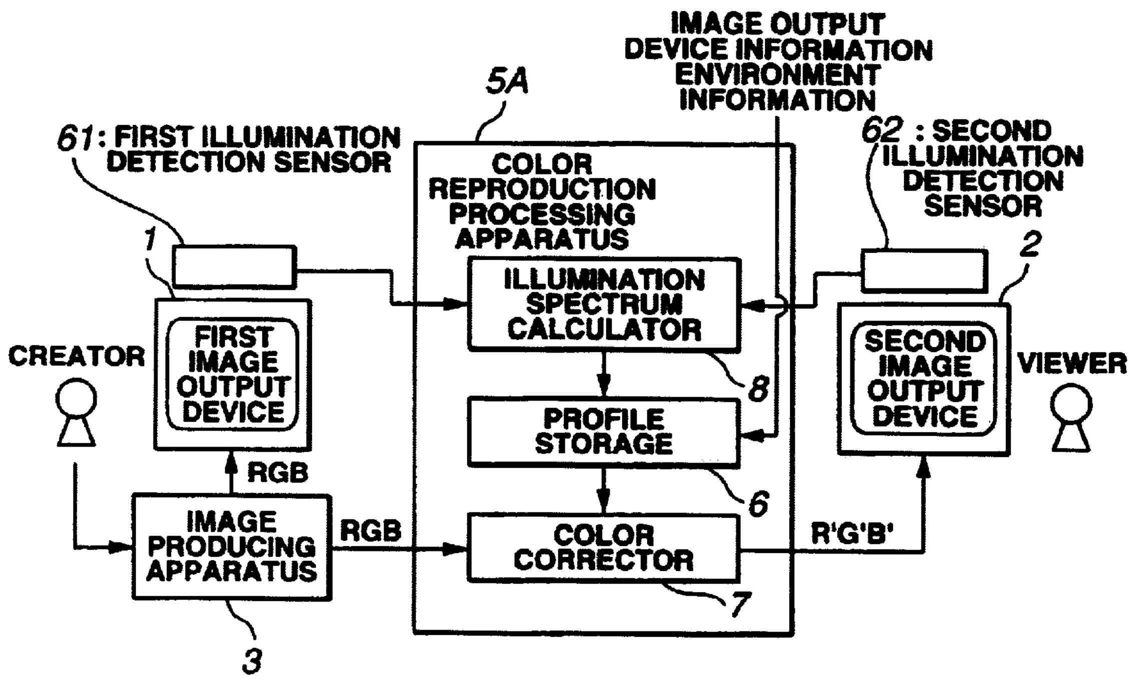
FIG. 6 is a block diagram showing the structure of the color reproducing apparatus in accordance with a second embodiment of the present invention.
Figure 7:
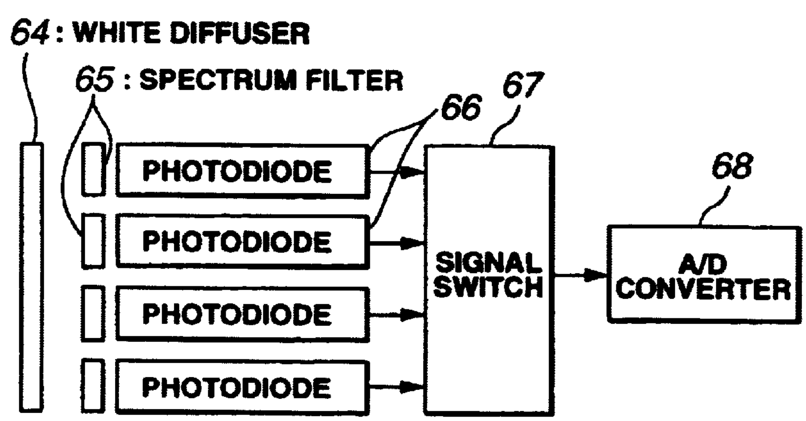
FIG. 7 shows a specific structure of an illumination detection sensor in accordance with the second embodiment of the present invention.
Figure 8:
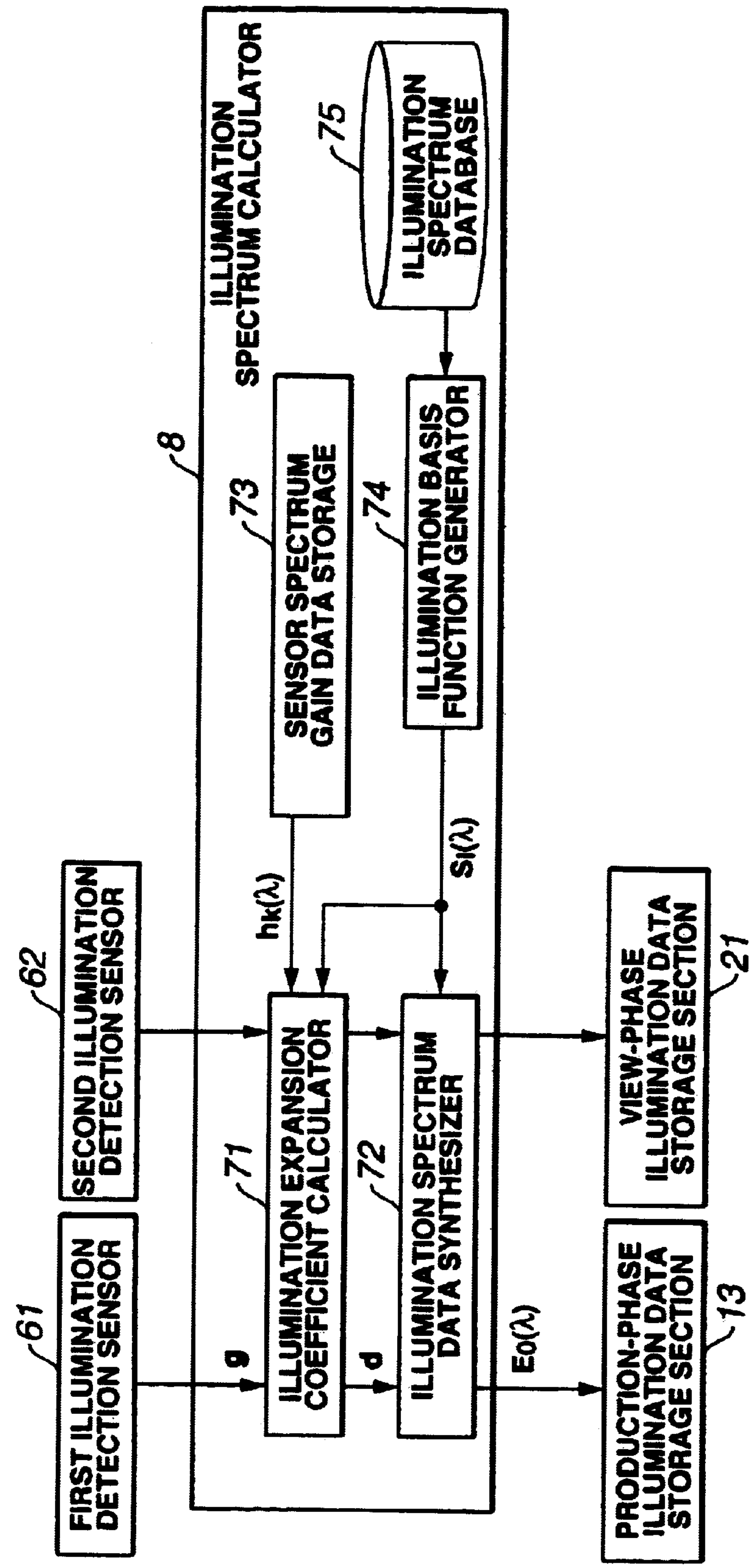
FIG. 8 is a block diagram showing an illumination spectrum calculator in the color reproducing apparatus in accordance with the second embodiment of the present invention.

FIGS. 6 through 8 show a second embodiment of the present invention. FIG. 6 is a block diagram roughly showing the structure of the color reproducing apparatus. With reference to the second embodiment shown in FIGS. 2 through 8, component identical to those discussed in connection with the first embodiment are designated with the same reference numerals and the discussion thereof is omitted. A difference between the first and second embodiments is mainly discussed.

As shown in FIG. 6, the color reproducing apparatus of the second embodiment includes an image producing apparatus 3 on which a creator adjusts to produce a color image, a first image output device 1 which receives RGB signals constituting an original image produced by the image producing apparatus 3 and which provides an image output, a color reproduction processing apparatus 5A which corrects the color of the image in accordance with the RGB signals produced by the image producing apparatus 3, a second image output device 2 which performs an image output such that the image can be viewable to a viewer based on R' G' B' signals which are a view image corrected by the color reproduction processing apparatus 5A, a first illumination detection sensor 61 for detecting environment information relating to illumination during a production phase, and a second illumination detection sensor 62 for detecting environment information relating to illumination during a view phase.

The color reproduction processing apparatus 5A includes an illumination spectrum calculator 8 which receives a sensor signal from the first illumination detection sensor 61 or the second illumination detection sensor 62 and which calculates spectrum data of the production phase or the view phase, a profile storage 6 which receives and stores the illumination spectrum information calculated by the illumination spectrum calculator 8, while also receiving and storing image output device information, and environment information relating to a color reproduction environment from the outside, and a color corrector 7 which corrects the color of an image based data output from the profile storage 6 and the RGB signals output from the image producing apparatus 3.

FIG. 7 shows a specific structure of the illumination detection sensors.

As shown in FIG. 7, the first illumination detection sensor 61 or the second illumination detection sensor 62 includes a white diffuser 64 which diffuses incident illumination light in a manner to impart uniform white light amount thereto while allowing the illumination light to transmit therethrough, a plurality of spectrum filters 65 arranged to permit light rays within a predetermined wavelength region out of light rays transmitted through the white diffuser 64, a plurality of photodiodes 66 which respectively receive light rays transmitted through the spectrum filters 65 and output electrical signals in response to the amount of received light, a signal switch 67 which successively switches and then outputs the signals output from the photodiodes 66, and an A/D converter 68 which converts the analog signal output from the signal switch 67 into a digital signal and outputs the digital signal to the illumination spectrum calculator 8 in the color reproduction processing apparatus 5A.

The photodiodes 66 may be of an ordinary type, because the photodiodes 66 are not intended for use in image pickup.

The plurality of spectrum filters 65 arranged in front of the photodiodes 23 cover different wavelength ranges one from another. The spectrum filters 65 in a group have light transmittance characteristics covering almost the entire visible light region.

The principle working for estimating illumination spectrum from the sensor output signal in the case where L illumination detection sensors having different spectrum gains will now be discussed.

The spectrum gain of the illumination detection sensor is determined from the product of a spectral transmissivity characteristic of the spectrum filter 65 and the spectrum gain of the photodiode 66 in the example shown in FIG. 7.

Let $h_k(\lambda)$ represent the spectrum gain of the spectrum filter and the photodiode at a k-th sensor (k=1, . . . , L), and $E_0(\lambda)$ represent the spectrum of the illumination. It is assumed that the illumination spectrum $E_0(\lambda)$ has a statistical property that allows itself to be expanded by L basis functions $s_l(\lambda)$ (l=1, . . . , L).

A signal $g_k$ acquired by the k-th sensor is expressed by equation 15 on the assumption that the sensor gain is linearly responsive to the intensity of light incident to the sensor.

$$g_k=\int E_0(\lambda)h_k(\lambda)d\lambda \quad \text{[Equation 15]}$$

Since the illumination spectrum $E_0(\lambda)$ is expanded using L basis functions $s_l(\lambda)$ (l=1, . . . , L), $E_0(\lambda)$ is expressed by equation 16 using expansion coefficient $d_l$(l=1, . . . , L).

$$E_0(\lambda)=\sum_{1=1}^{L} d_1 s_1(\lambda) \quad \text{[Equation 16]}$$

Equation 15 is rewritten as the following equation 17.

$$g_k=\sum_{1=1}^{L} d_1 a_{1k} \quad \text{[Equation 17]}$$

where $$a_{lk}=\int S_l(\lambda)h_k(\lambda)d\lambda \quad \text{[Equation 18]}$$

A signal value expressed by equation 17 is obtained for L sensor gains, and these are expressed in a matrix in equation 19.

$$\begin{pmatrix} g_1 \\ g_2 \\ \vdots \\ g_L \end{pmatrix} = \begin{pmatrix} a_{11} & a_{21} & \cdots & a_{L1} \\ a_{12} & a_{22} & \cdots & a_{L2} \\ \vdots & \vdots & \ddots & \vdots \\ a_{1L} & a_{2L} & \cdots & a_{LL} \end{pmatrix} \begin{pmatrix} d_1 \\ d_2 \\ \vdots \\ d_L \end{pmatrix} \quad \text{[Equation 19]}$$

Let g and d represent the vectors and A represent the matrix appearing in equation 19, and $$g=Ad \quad \text{[Equation 20]}$$

The matrix A in equation 20 is a known amount, because the matrix A is determined from a basis function $s_l(\lambda)$, which is a known amount and a spectrum gain $h_k(\lambda)$, which is also a known amount. The vector g is also a known amount which is determined through observation (measurement).

The vector d, as an unknown amount, of the expansion coefficient $d_l$ (l=1, . . . , L) of each basis function of the illumination spectrum is determined from the following equation 21 using the above-mentioned known amounts.

$$d=A^{-1}g \quad \text{[Equation 21]}$$

If the inverse matrix of the matrix A constituted by known amounts is calculated beforehand, the vector d is immediately calculated using equation 21 each time the vector g, as an observed value, is acquired.

The spectrum $E_0(\lambda)$ of the illumination is thus determined by substituting the obtained vector d in equation 16.

In the above discussion, the number of sensors is L, and the number of basis functions is L. More generally, let m represent the number of sensors, and let n represent the number of basis functions, and the relationship of m>n is assumed to hold. In the above principle, g becomes an m order vector, d becomes an n order vector, and A becomes an m×n non-square matrix.

The expansion coefficient of the basis function is determined using the least squares method expressed by equation 22.

$$d\cong(A^TA)^{-1}A^Tg \quad \text{[Equation 22]}$$

For example, as discussed in a paper entitled "Natural Color Reproduction of Human Skin for Telemedicine" authored by Ohya et al., Conference On Image Display (SPIE) Vol. 3335, pp 263–270, San Diego, Calif., February 1998, the expansion coefficient of the basis function may be determined using the Wiener estimate as expressed by equation 23.

$$d\cong\langle aa^T\rangle A^T(A\langle aa^T\rangle A^T)^{-1}g \quad \text{[Equation 23]}$$

Symbols "<>" represent an operator to determine an ensemble average.

Rather than using outputs of all m sensors, outputs of n sensors only may be used with the remaining sensor outputs eliminated. Alternatively, m sensor outputs may be interpolated, resulting in n sensor outputs. In this case, the above discussed principle applies as is by simply substituting n for L.

If m<n, a new set of basis functions must be selected to establish the relationship of m≧n, or a sufficiently large number of sensors must be prepared to match any number of basis functions prepared in a database or the like.

FIG. 8 is a block diagram showing the illumination spectrum calculator 8 in the color reproduction processing apparatus 5A.

The illumination spectrum calculator 8 includes: an illumination spectrum database 75 having spectrum data of a variety of types of illuminations registered therewithin; an illumination basis function generator 74 which selects several pieces of preliminary assumed illumination spectrum data out of the illumination spectrum data stored in the illumination spectrum database 75 and generates illumination basis function data $s_l(\lambda)$ (l=1, . . . , L), a sensor spectrum gain data storage 73 which stores beforehand the spectrum gain characteristic data $h_k(\lambda)$(k=1, . . . , L) of the photodiodes 66 by each spectrum filters 65 in combination of either the first illumination detection sensor 61 or the second illumination detection sensor 62; an illumination expansion coefficient calculator 71 which calculates the expansion coefficient d of the illumination based on the input signal g from the first illumination detection sensor 61 or the second illumination detection sensor 62, the illumination basis function data $s_l(\lambda)$, and the spectrum gain characteristic data $h_k(\lambda)$; and an illumination spectrum data synthesizer 72 which synthesizes the spectrum $E_0(\lambda)$ of the illumination of the production phase or the view phase based on the expansion coefficient d calculated by the illumination expansion coefficient calculator 71, the illumination basis function data $s_l(\lambda)$ (l=1, . . . , L) generated and stored in the illumination basis function generator 74.

Such the second embodiment provides substantially the same advantages as the first embodiment. Furthermore, with the illumination detection sensors, the spectrum information of the illumination during the production phase of the image or the view phase of the image is acquired on a real-time basis. Even when the environment momently changes, color reproduction is performed with high precision.

The illumination spectrum calculator uses the statistical information of the preliminary assumed illumination spectrum as the basis function data of the illumination light. Even when there is a small amount of spectrum information available from the illumination detection sensors, the spectrum of the illumination during the production phase or the view phase is estimated with a high precision.

Figure 9:
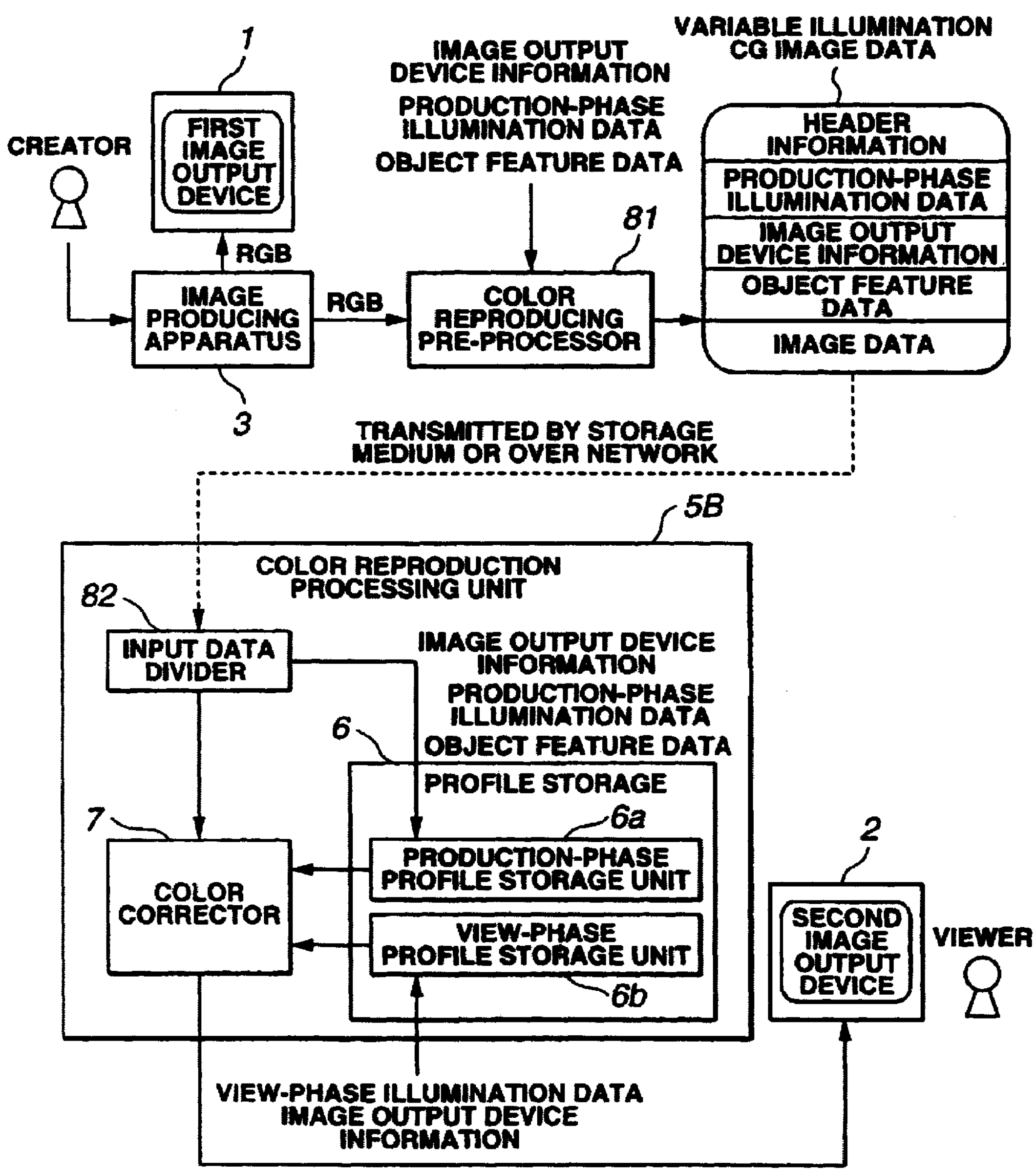
FIG. 9 is a block diagram showing the structure of the color reproducing apparatus in accordance with a third embodiment of the present invention.

FIGS. 9 through 12 show a third embodiment of the present invention. FIG. 9 is a block diagram showing the structure of a color reproducing apparatus. In the discussion of the third embodiment, elements identical to those described in connection with the first and second embodiments are designated with the same reference numerals, and the discussion thereof is omitted. Differences between the third embodiment and the first and second embodiments are mainly discussed.

In the third embodiment, the image which the creator produces using the first image output device 1 contains part of the image output device information and the environment information required to correct color. Image data having an illumination convertible data structure is used to correct color.

As shown in FIG. 9, the color reproducing apparatus of the third embodiment includes: an image producing apparatus 3 on which a creator adjusts to produce a color image, a first image output device 1 which receives RGB signals constituting an original image produced by the image producing apparatus 3 and which provides an image output; a color reproducing pre-processor 81 which generates image data (illumination convertible CG image data) in a format (referred to as a illumination convertible CG image format) that permits color conversion in response to a change in color due to the effect of the illumination, by combining the image data produced by the image producing apparatus 3, the image output device information, and a variety of pieces of environment information relating to the color reproduction environment during the production phase (such as the production-phase illumination data and the object characteristic data); a color reproduction processing unit 5B which performs color correction on the illumination convertible CG image data output through the storage medium or the network from the color reproducing pre-processor 81; and a second image output device 2 which outputs the image data color corrected by the color reproduction processing unit 5B.

The color reproduction processing unit 5B, more in detail, includes: an input data divider 82 which divides again the input illumination convertible CG image data into the image data, the production-phase image output device information and the environment information; a profile storage 6 which stores, onto a production-phase profile storage 6*a*, the production-phase image output device information and the environment information which have been divided by the input data divider 82, while storing, onto a view-phase profile storage 6*b*, the view-phase image output device information and the view-phase environment information (such as the view-phase illumination data) provided from the outside; and a color corrector 7 which performs illumination conversion on the object represented by the image data divided by the input data divider 82, using each piece of the data stored in the profile storage 6.

The illumination convertible CG image data contains header information, production-phase illumination data, image output device information, object characteristic data, and image data.

The production-phase image output device information and at least part of the production-phase environment information are imparted to the image data itself in this way. These pieces of information are acquired by simply inputting the image data to the color reproduction processing unit 5B. The view-phase image input device information and the view-phase environment information, not contained in the image data, are acquired by inputting these pieces of information to the color reproduction processing unit 5B from the outside in the same manner as the above-referenced embodiments.

The color reproducing pre-processor 81 organizes the image data, the production-phase image output device information and the part of the production-phase environment information in one data structure. Such image data is easy to handle, thereby allowing the illumination of the view phase to be modified arbitrarily and easily.

Figure 10:
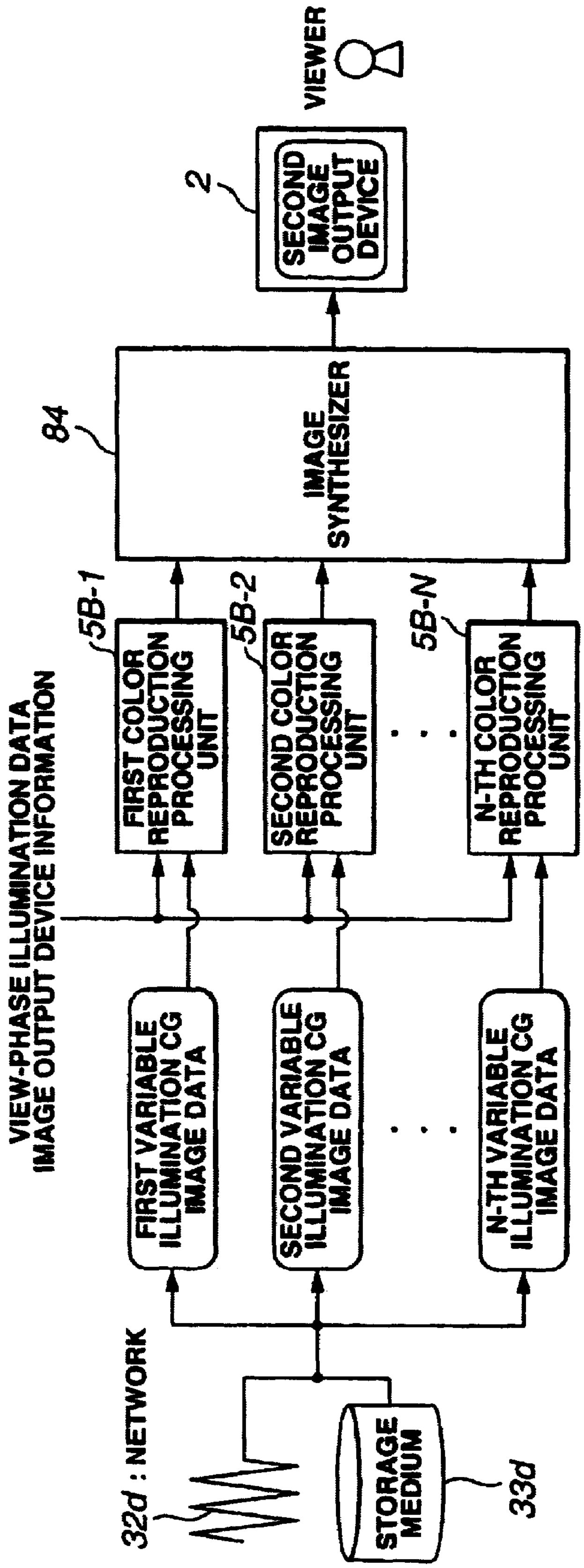
FIG. 10 is a block diagram showing the structure of the color reproducing apparatus in accordance with a first modification of the third embodiment of the present invention.
Figure 11:
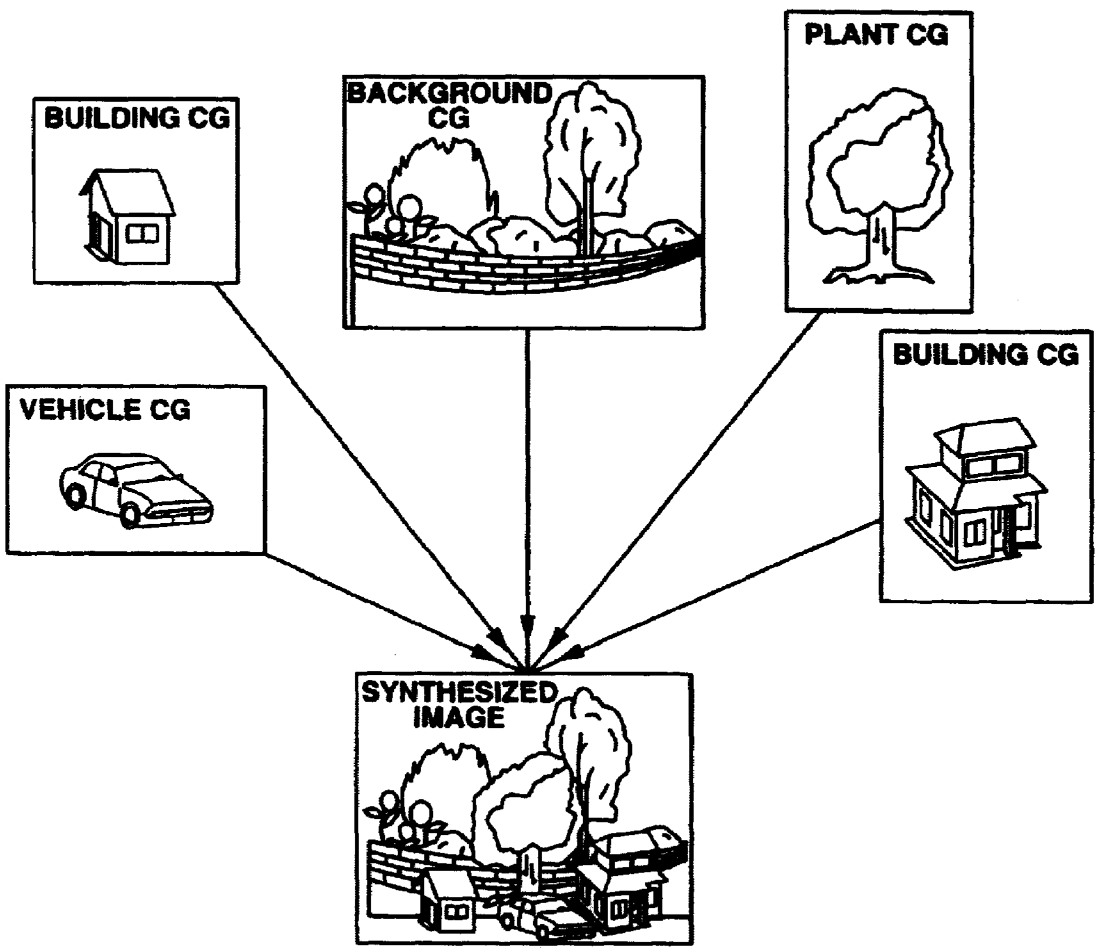
FIG. 11 shows practical image examples in accordance with the first modification of the third embodiment of the present invention.

A first modification of the third embodiment will now be discussed with reference to FIGS. 10 and 11. FIG. 10 is a block diagram showing the structure of the color reproducing apparatus in accordance with the first modification of the third embodiment of the present invention, and FIG. 11 shows practical image examples in accordance with the first modification of the third embodiment of the present invention.

In the first modification, a plurality of pieces of image data partially produced by a creator under a different environment or by a different creator are converted into images under a common view-phase environment, and then synthesized into a single image.

As shown in FIG. 10, the color reproducing apparatus of the first modification includes: N color reproduction processing units (a first color reproduction processing unit 5B-1 through a N-th color reproduction processing unit 5B-N) which perform color correction on N pieces of illumination convertible CG image data (first illumination convertible CG image data through N-th illumination convertible CG image data) output from a network 32*d* or a storage medium 33*d*, based on one type of image output device information and one type of view-phase illumination data input from the outside; an image synthesizer 84 as synthesizing means for synthesizing N frames of image data color corrected and output by the N color reproduction processing units 5B-1 through 5B-N into a single frame of image data; and a second image output device 2 for outputting the image, synthesized by the image synthesizer 84, in a viewable fashion.

Each of the first color reproduction processing unit 5B-1 through the N-th color reproduction processing unit 5B-N is identical in structure to the color reproduction processing unit 5B as shown in FIG. 9.

Here, the N color reproduction processing units 5B-1 through 5B-N are arranged in one-to-one correspondence with the input N pieces of illumination convertible CG image data. Alternatively, a single color reproduction processing unit 5 may process N pieces of illumination convertible CG data which are successively input thereto.

If the color reproducing apparatus thus constructed registers and stores parts of the CG image data such as those of plants, vehicles, buildings, and backgrounds as illumination convertible CG image data in a database, etc., the user designs and simulates an image by referencing the database, collecting a variety of CG image data from the database, and freely synthesizing these CG images.

Even if the pieces of the CG image data are produced by different creators, or under different environments, or on different image output devices, the CG image data is easily synthesized into a color reproduced image under the same environment. A synthesized image is thus obtained naturally without the need for complicated color adjustment operations. Image simulation on the synthesized image may be performed by changing illumination environment to a diversity of settings.

The color reproducing apparatus thus constructed may segment a single produced frame of image by object into a plurality of regions and stores the segmented images as a plurality of pieces of illumination convertible CG image data. Each illumination convertible CG image data thus contains its own object characteristic data. An image is color reproduced by converting and then synthesizing these pieces of illumination convertible CG image data with a higher precision than a method in which an original frame is handled as a single entire image.

Figure 12:
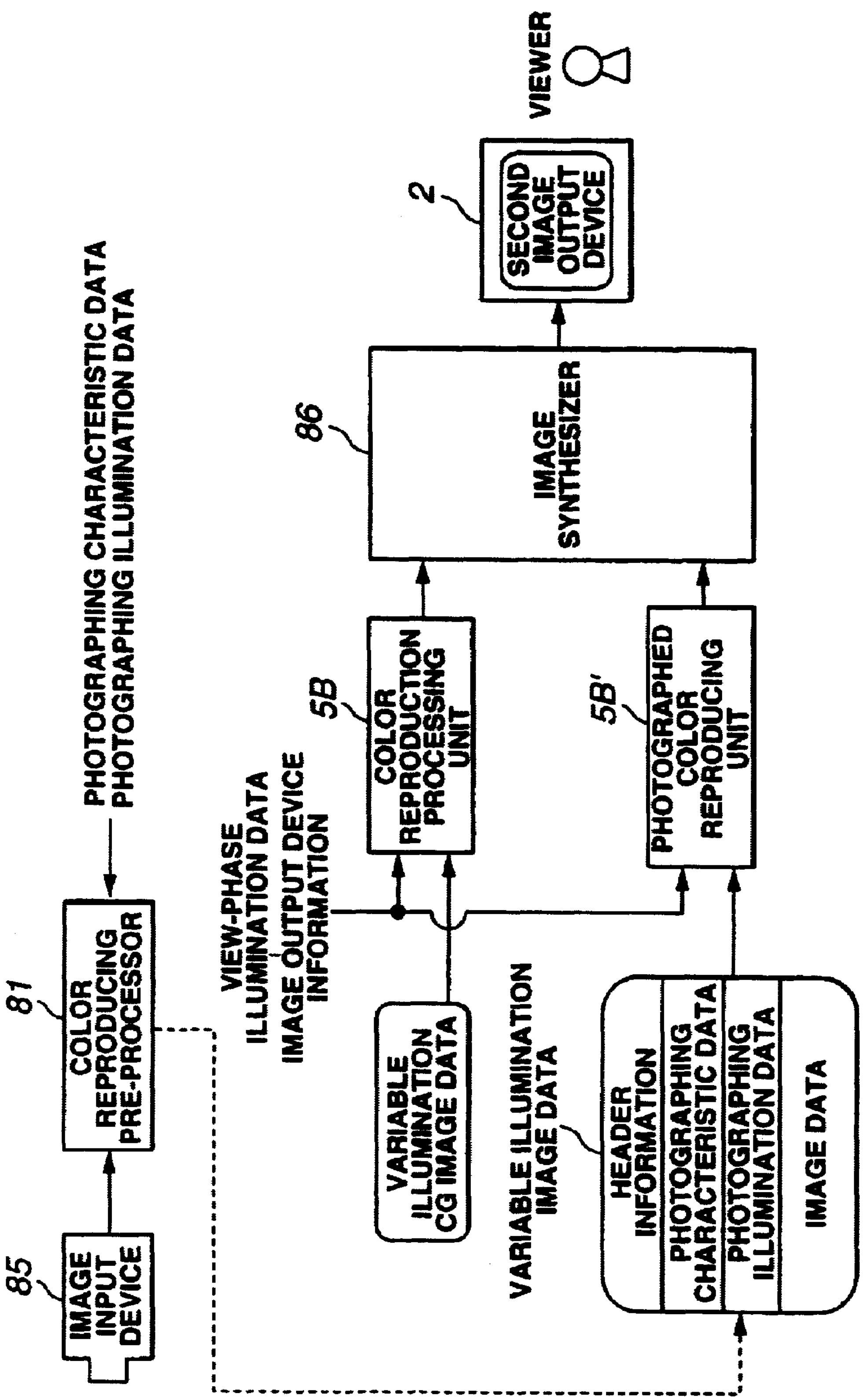
FIG. 12 is a block diagram showing the structure of the color reproducing apparatus in accordance with a second modification of the third embodiment of the present invention.

A second modification of the third embodiment of the present invention will now be discussed with reference to FIG. 12. FIG. 12 is a block diagram showing the structure of the color reproducing apparatus in accordance with the second modification of the third embodiment of the present invention.

In the first modification of the third embodiment, a plurality of pieces of CG image data are combined in a illumination convertible fashion. In the second modification, not only the CG image data but also real photographed image data is also combined in an illumination convertible fashion.

Specifically, in accordance with the second modification, the illumination convertible CG image data discussed in connection with the first modification and image data (illumination convertible image data) in an illumination convertible format that allowed on a real image, for example, photographed by an image input device as disclosed in Japanese Unexamined Patent Application Publication No. 11-96333, are color corrected and then synthesized.

As shown in FIG. 12, the color reproducing apparatus of the second modification of the third embodiment includes: an image input device 85 for photographing a subject to be synthesized; a color reproducing pre-processor 81 which converts the image photographed by the image input device 85 in accordance with photographing characteristic data and photographing illumination data provided from the outside during photographing, into data (illumination convertible image data) having an image format that enables an illumination conversion in a subsequent color reproduction process; a photographed color reproduction processing unit 5B' which performs color correction on the image of a subject under an illumination environment during a view phase based on the illumination convertible image data output from the color reproducing pre-processor 81, the view-phase illumination data and the image output device information; a color reproduction processing unit 5B which performs color correction based on the above-referenced illumination convertible CG image data, the view-phase illumination data, and the image output device information; an image synthesizer 86 as synthesizing means for synthesizing the CG image data color corrected by the color reproducing unit 5B and photographed image data color corrected by the photographed color reproducing unit 5B'; and a second image output device 2 which displays a synthesized image output from the image synthesizer 86.

The illumination convertible image data contains header information, photographing characteristic data, photographing illumination data, and image data.

The third embodiment provides substantially the same advantages as the first and second embodiments. Furthermore, since the image data itself contains the characteristic data and the illumination data, handling of the image data is easy. Color correction is easy to perform in the synthesis of a plurality CG images and the synthesis of a CG image and a photographed image. A plurality of images produced at a remote place may be thus synthesized with a high precision.

Figure 13:
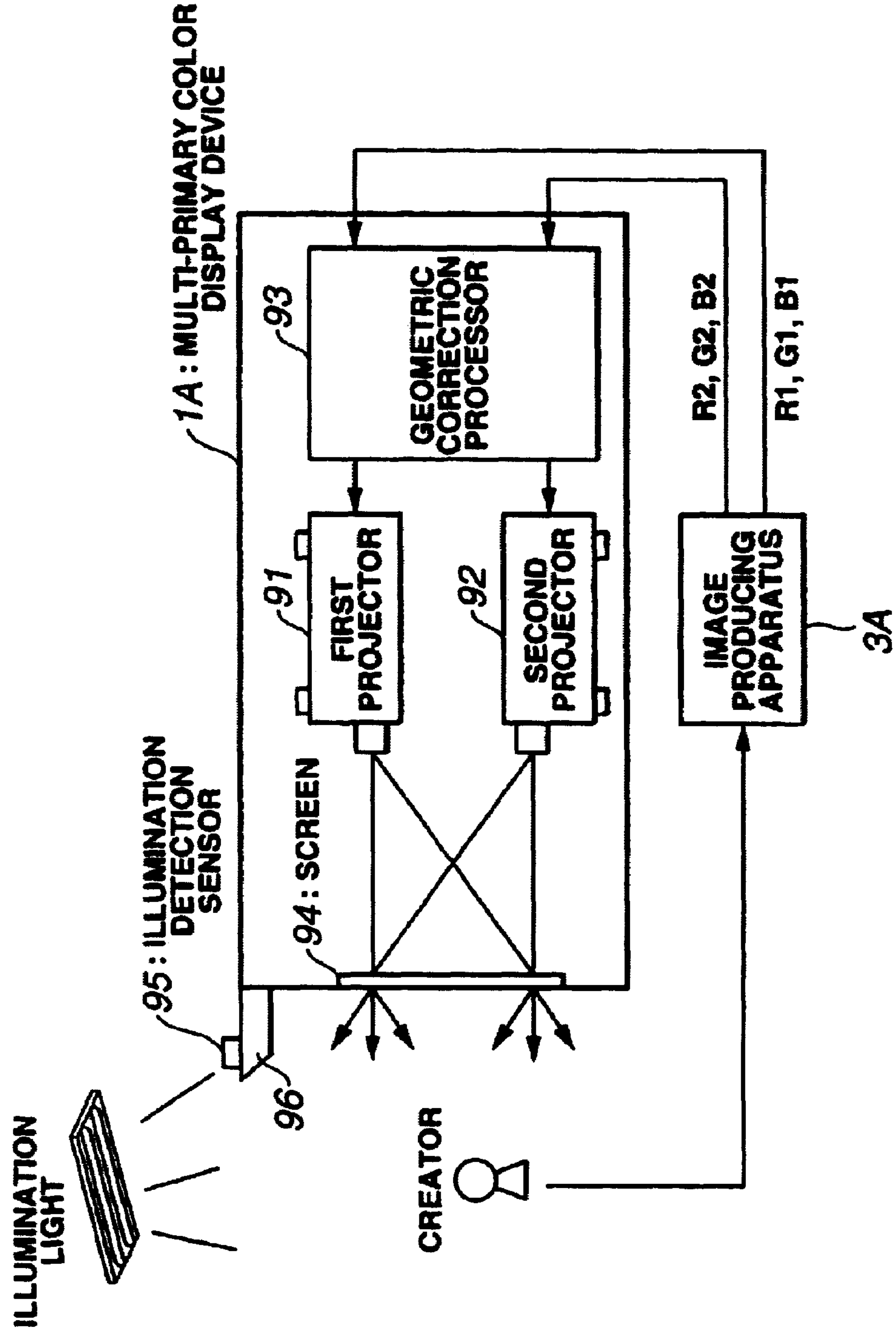
FIG. 13 is a block diagram showing the structure of the color reproducing apparatus in accordance with a fourth embodiment of the present invention.

FIGS. 13 through 16 show a fourth embodiment. FIG. 13 is a block diagram showing the structure of the color reproduction processing apparatus. In the discussion of the fourth embodiment, elements identical to those described in connection with the first through third embodiments are designated with the same reference numerals, and the discussion thereof is omitted. Differences between the fourth embodiment and the first through third embodiments are mainly discussed.

The fourth embodiment relates to a color reproducing apparatus which produces an image using multi primary colors of at least four.

As shown in FIG. 13, the color reproducing apparatus includes a multi-primary-color display device 1A which presents a color image of at least 4 primary colors (6 primary colors here) through additive mixing when a creator produces an image of an object, and an image producing apparatus 3A which adjusts an image signal of at least 4 primary colors (6 primary colors here). The color reproduction processing apparatus 5 and the second image output device 2 are also included, although they are not shown in FIG. 13.

The multi-primary-color display device 1A includes: a geometric correction processor 93 as geometric correction means for geometrically correcting an image of the three primary colors of R1, G1, and B1 or R2, G2, and B2 output from the image producing apparatus 3A; a first projector 91 which receives image signals of the three primary colors of R1, G1, and B1 geometrically corrected by the geometric correction processor 93 and outputs a three-primary-color image in response; a second projector 92 which receives image signals of the three primary colors of R2, G2, and B2 geometrically corrected by the geometric correction processor 93 and outputs a three-primary-color image in response; a transmissive-type screen 94 which presents a six-primary-color image when an R1, G1, and B1 image projected by the first projector 91 from behind, and an R2, G2, and B2 image projected by the second projector 92 from behind are superimposed entirely thereon; a hood 96 which prevents the color image presented on the transmissive-type screen 94 from being adversely affected by ambient illumination light; and an illumination detection sensor 95 mounted on the hood 96 for detecting an ambient environment illumination light.

The geometric correction processor 93 performs a geometrical correction process on the input images such that the image projected on the screen 94 by the first projector 91 and the image projected on the screen 94 by the second project 92 are correctly aligned with each other within a superimposed projection area.

The first projector 91 and the second projector 92 are basically identical in structure to each other except for the emission spectrum of the primary colors projected onto the screen 94. Furthermore, the optical axes of the projection optical systems of the projectors 91 and 92 are disposed to be substantially parallel to each other, and substantially perpendicular to the main surface of the screen 94. At the same time, the projectors 91 and 92 are arranged such that a light ray directed to the center of a projected image (approximately the center of the screen 94) is projected at a projection angle with respect to the optical axis of each projection optical system. In this case, the projectors 91 and 92 are arranged in symmetrical positions with one above the other. As for images presented on display devices such as transmissive type LCDs in the projectors 91 and 92, one image appears in normal position on one display device and the other image appears upside down on the other display device. In this way, the two images become aligned on the screen 94.

The image projected by the first projector 91 and the image projected by the second projector 92 are thus overlaid in alignment without introducing a large distortion or blurring.

A total reflecting mirror may be arranged in the projection optical path of each of the projectors 91 and 92 so that one projection optical path does not block the other projection optical path. This arrangement assures an optical path length within a small space, thereby introducing compact design in the multi-primary-color display device 1A.

In the projectors 91 and 92, illumination light may be separated into R1, G1, and B1 and R2, G2, and B2 through dichroic prisms or the like, and display devices such as transmissive-type LCDs are arranged on respective optical paths of respective colors. In this arrangement, color shifts may take place at the periphery of a projected luminous flux due to a difference in optical path length of the colors and a deviation in the positions of pupils depending on wavelength.

By arranging the projectors in the symmetrical positions thereof as described above, color non-uniformities projected on the screen 94 are symmetrically distributed, thereby canceling each other if the two projectors are identical in the tendency of the color non-uniformity. The color non-uniformity is thus more reduced than when the image is projected using a single projector.

As disclosed in Japanese Unexamined Patent Application Publication No. 2001-272727, the screen 94 is designed to output a diffused light beam having a substantially uniform directivity in response to light beams incident at different angles. Specifically, a light ray from the first projector 91 and a light ray from the second projector 92, even if incident on the same position on the screen 94, have different incident angles. Light rays exiting from the screen 94 become diffused with respect to a direction perpendicular to the main surface of the screen 94. Even if the screen 94 is viewed at an inclination, an image as a result of overlaying the light rays at equal ratios from the two projectors appears. The creator and the viewer thus view a high-quality image free from a change in color even with the viewing angle varied within a substantial range.

The illumination detection sensor 95 is identical in structure to the one used in the second embodiment discussed with reference to FIG. 7. As already discussed, the illumination detection sensor 95 is mounted on the end of the hood 96 attached to the top portion of the multi-primary-color display device 1A.

The above-referenced arrangement prevents the screen 94 from being affected by the effect of reflection of the ambient illumination light (such as halation). The illumination detection sensor 95 acquires information relating to illumination light as if the illumination light were incident on the front surface of the screen 94 that displays the object.

Here, a rear projection type projector has been discussed. A front projection type projector may also be acceptable. In this case, the screen must be of a reflective type.

Figure 14:
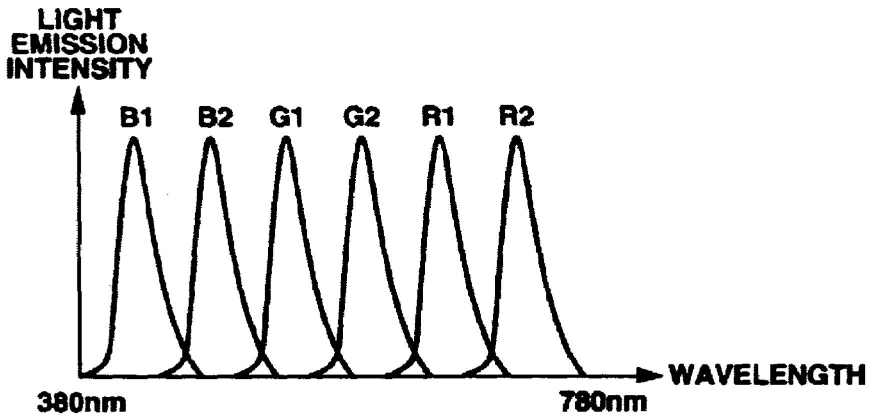
FIG. 14 diagrammatically shows a plot of an emission spectrum of primary colors R1, G1, and B1 of a first projector and an emission spectrum of primary colors R2, G2, and B2 of a second projector in accordance with the fourth embodiment.

FIG. 14 diagrammatically shows a plot of emission spectra of primary colors R1, G1, and B1 of the first projector 91 and emission spectra of primary colors R2, G2, and B2 of the second projector 92.

As shown, the emission spectra of the 6 primary colors R1, G1, B1, R2, G2, and B2 are distributed at substantially regular intervals in wavelength axis, thereby almost covering a visible wavelength range from 380 nm to 780 nm. The peaks of the emission intensity are B1, B2, G1, G2, R1, and R2 in the order, from short to long wavelength.

Figure 15:
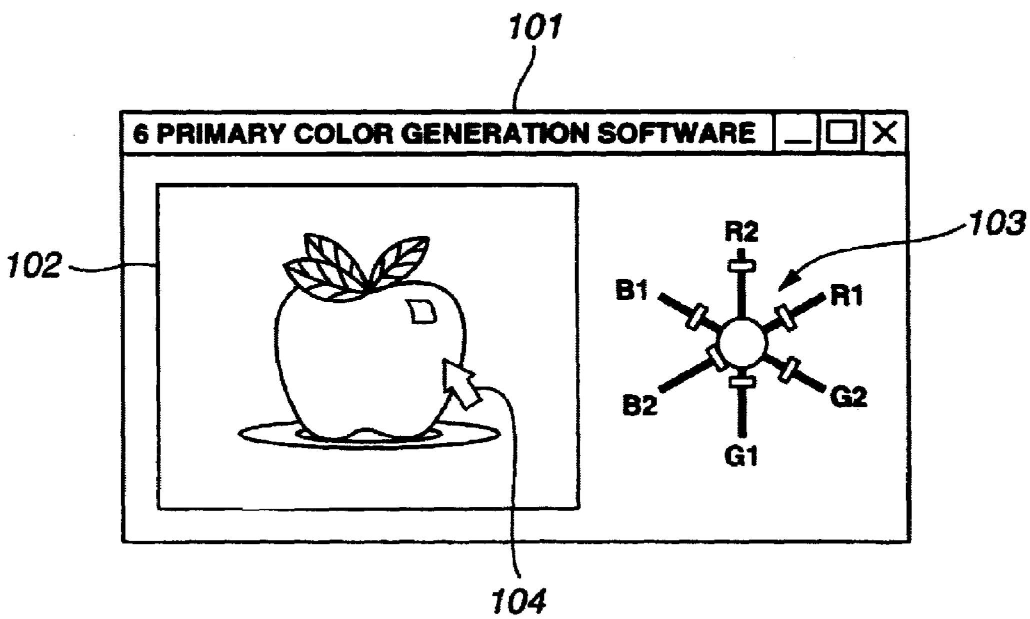
FIG. 15 shows an interface screen which a creator uses to adjust six primary colors in the image producing apparatus in accordance with the fourth embodiment of the present invention.

The image producing apparatus 3A is discussed below with reference to FIG. 15. FIG. 15 shows a user interface screen which a creator uses to adjust six primary colors in an image producing apparatus 3A.

The image producing apparatus 3A produces the 6 primary color image data when the creator adjusts the 6 primary colors R1, G1, B1, R2, G2, and B2. The image producing apparatus 3A outputs the produced image signals R1, G1, B1, R2, G2, and B2 to the multi-primary-color display device 1A.

The creator designates a point or an area in an object in a displayed image 102 on an operation screen 101 by a movable pointer 104 using a mouse, etc. The 6 primary colors R1, G1, B1, R2, G2, and B2 are independently adjusted with respect to the designated point or area by referencing a shown status bar 103.

The 6 primary color image data thus adjusted is output from the image producing apparatus 3A to the multi-primary-color display device 1A in accordance with the adjustment carried out by the creator. The 6 primary color image is thus produced in an interactive manner.

The status bars 103 for adjusting the 6 primary colors are radially arranged in a manner corresponding to the Munsell color system such that the creator may easily imagine a color reproduced in accordance with the status of each status bar 103.

It is not a requirement that a user interface in the image producing apparatus 3A independently adjusts the image signals of at least 4 primary colors. The user interface may be designed to adjust the RGB three primary colors as in a conventional method, or may be designed to adjust colors in three attributes of hue, saturation, and value in an HSV space.

Figure 16:
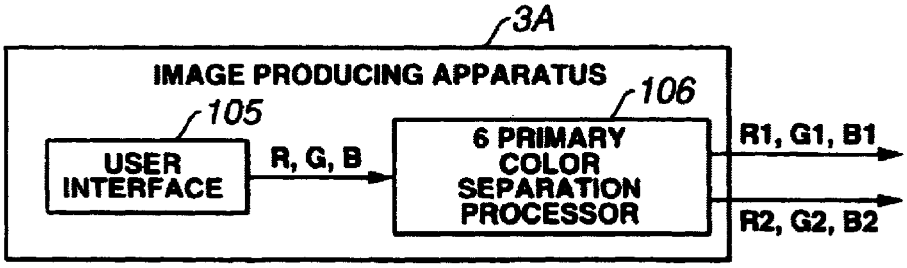
FIG. 16 shows the structure of the image producing apparatus that outputs six primary colors that are adjusted in response to an RGB input in accordance with the fourth embodiment of the present invention.

FIG. 16 shows the structure of an image producing apparatus that outputs six primary colors that are adjusted in response to an input RGB.

The image producing apparatus 3A includes a user interface 105 that designates a color of an object by receiving an RGB input, and a 6 primary color separation processor 106 which automatically separates the RGB designated by the user interface 105 into the 6 primary colors R1, G1, B1, R2, G2, and B2.

In the above embodiment, the two projectors project different sets of 3 primary colors, thereby presenting a 6 primary color image on the screen. Alternatively, a 3 primary color stereo-vision (3D) image may be projected and displayed, or the same sets of 3 primary color images may be projected and displayed for higher luminance.

Four projectors may be used to display 12 primary colors. The four projectors may be divided into two groups, which display a 6 primary color stereo-vision image. The four projectors may be used together to display a 3 primary color image at a higher luminance. The four projectors may be divided into two groups, which display a 3 primary color stereo-vision image at a higher luminance.

The number of projectors is not limited to two. The projectors of any number may be arranged to display one of or a combination of a color image output having at least 4 primary colors, a stereo-vision image output, and an image output for enhancing display luminance.

The fourth embodiment provides the same advantages as the first through third embodiments. Furthermore, the use of the image output device outputting an image of at least 4 primary colors provides a substantial increase in a color displayable range in comparison of a 3 primary color display device which has been conventionally used in image production. The color reproducing apparatus of the fourth embodiment thus produces in a higher saturation a color image which the conventional 3 primary color display device cannot present.

Since the image producing apparatus that allows the image signals of at least 4 primary colors to be independently adjusted is used, hue is adjusted at such finer steps than the conventional 3 primary color system. The image producing apparatus thus relatively easily adjusts the color of the object to a color intended by the creator.

When the image producing apparatus that adjusts the image signals of at least 4 primary colors by designating the 3 primary colors or 3 attributes is used, the creator is free from paying attention to the number of primary colors in the image output device or what color each primary color is. With the same operability as the one applied to the conventional 3 primary color image output device, the color image of at least 4 primary colors is produced.

Figure 17:
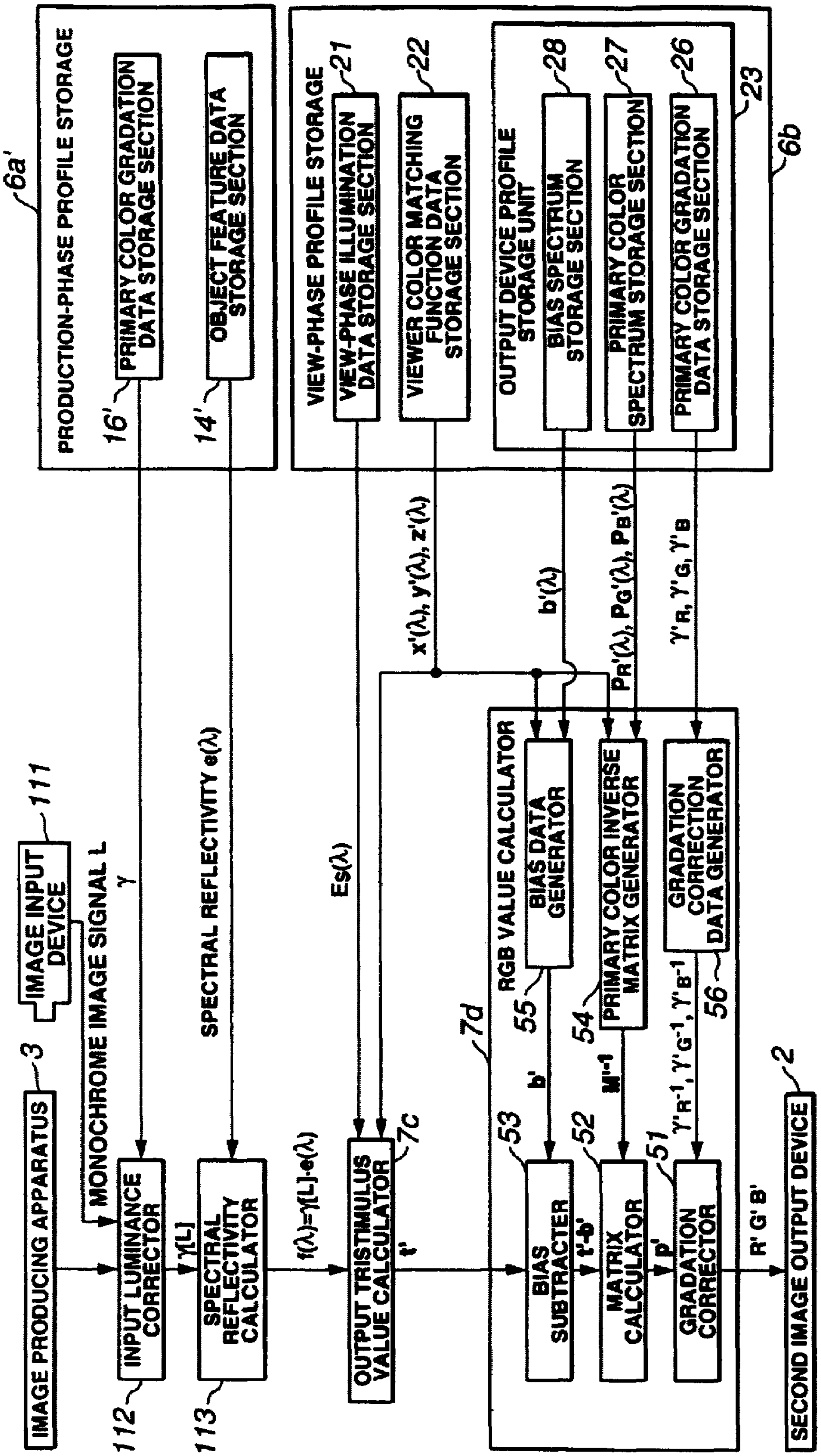
FIG. 17 is a block diagram showing the structure of the color reproducing apparatus in accordance with a fifth embodiment of the present invention.

FIG. 17 is a block diagram showing the structure of the color reproducing apparatus in accordance with a fifth embodiment of the present invention. In the discussion of the fifth embodiment, elements identical to those discussed in connection with the first through fourth embodiments are designated with the same reference numerals, and the discussion thereof is omitted here. Differences between the fifth embodiment and the first through fourth embodiments are mainly discussed here.

In the fifth embodiment, spectral reflectivity data (i.e., a single piece of basis function data) of an object as an object characteristic data supplied from the outside is imparted to a monochrome image of the object when a creator produces the monochrome image of the object. The color of the object is calculated during the view phase, and thus, a color image is generated from the monochrome image and is output.

The color reproducing apparatus of the fifth embodiment remains almost identical to the color reproducing apparatus in the first embodiment except the color reproduction processing apparatus 5. However, the image producing apparatus 3 is assumed to create a monochrome image that is constituted only by a luminance component of an object, and to output the luminance signal to the color reproduction processing apparatus.

Referring to FIG. 17, the structure of the color reproduction processing apparatus of the fifth embodiment is discussed below.

A profile storage 6 includes a production-phase profile storage 6*a*' and a view-phase profile storage 6*b*. Since the image is a color one during the view phase, the view-phase profile storage 6*b* is identical to the one in the first embodiment. Since the image is a monochrome one during the production phase, the production-phase profile storage 6*a'* is different in structure from the one in the first embodiment.

Specifically, the production-phase profile storage 6*a*' includes a primary color gradation data storage section 16' and an object characteristic data storage section 14'.

A color corrector 7 includes, as the major components thereof, an input luminance corrector 112, a spectral reflectivity calculator 113, an output tristimulus value calculator 7*c*, and an RGB value calculator 7*d*.

The input luminance corrector 112 performs gradation correction on the input luminance signal based on the luminance signal L of the monochrome image output from the image producing apparatus 3, and gradation characteristic data $\gamma$ representing the relationship of the output luminance to the luminance signal in the first image output device 1 of the production phase stored in the primary color gradation data storage section 16' in the production-phase profile storage 6*a'*.

The spectral reflectivity calculator 113 calculates the spectral reflectivity $f(\lambda)$ of the object by multiplying a corrected luminance value $\gamma[L]$ output from the input luminance corrector 112 by a single piece of basis function data $e(\lambda)$ as the spectral reflectivity data of the object stored in the object characteristic data storage section 14' in the production-phase profile storage 6*a*'. The single piece of basis function data $e(\lambda)$ is the spectral reflectivity data that is obtained by standardizing the luminance component of the object selected from the database, etc., by the user.

The output tristimulus value calculator 7*c* and the RGB value calculator 7*d*, that handle the signals after gaining dependency on the wavelength $\lambda$, i.e., becoming the data of the color image, are identical to those in the first embodiment discussed with reference to FIG. 5.

The color reproducing apparatus thus constructed first produces a monochrome image of an object using the image producing apparatus even if the creator does not know the color of a sample paint to be used on a car when the creator designs the car (object), for example. During next color correction, the spectral reflectivity data of the sample paint is supplied as the basis function data of the object. The color image of the object is thus simulated during the view phase when that paint is used.

In the above discussion, the monochrome image produced by the image producing apparatus 3 is processed. The output from an image input device 111 photographing a monochrome image may be processed.

The fifth embodiment provides substantially the same advantages as the first through fourth embodiments. Furthermore, the spectral reflectivity data is imparted to the object produced or photographed as a monochrome image. A color image is generated. Color simulation is thus carried out during the view phase.

Figure 18:
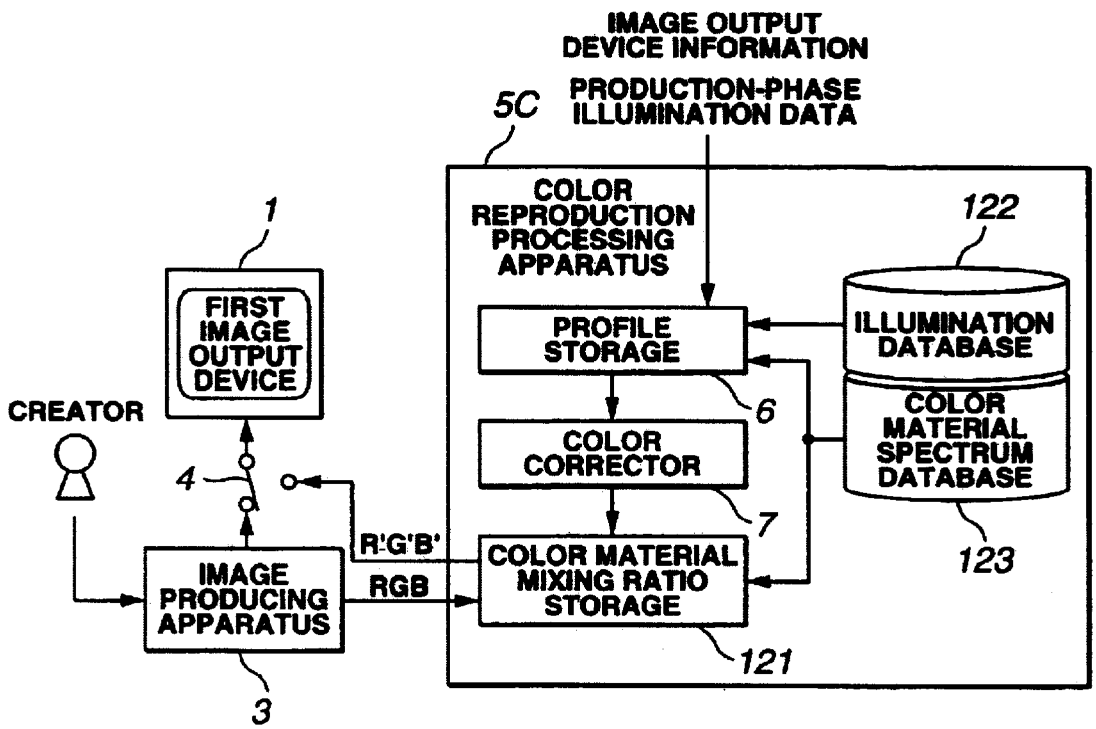
FIG. 18 is a block diagram showing the color reproducing apparatus in accordance with a sixth embodiment of the present invention.

FIG. 18 is a block diagram showing the color reproducing apparatus in accordance with a sixth embodiment of the present invention. In the sixth embodiment, elements identical to those discussed in connection with the first through fifth embodiments are designated with the same reference numerals and the discussion thereof is omitted. Difference between the sixth embodiment and the first through fifth embodiments are mainly discussed.

In accordance with the sixth embodiment, the user designates several color materials (materials such as paints to be mixed to form a color) when the spectral reflectivity of the object is estimated from the color image produced by the creator. The spectral reflectivity of the object is expanded based on the spectral reflectivity data of the designated color materials. The mixing ratio of the color materials to constitute the object are stored as an image.

The color of the object under a variety of illuminations is calculated and reproduced on the image output device using the expanded spectral reflectivity. By doing so, a change in color of the object due to a change in the illumination is simulated when the object is constituted by the designated color material.

As in the first embodiment shown in FIG. 2, the color reproducing apparatus of the sixth embodiment includes an image producing apparatus 3 by which a creator adjusts to produce a color image, a color reproduction processing apparatus 5C which performs color correction based on the RGB signals produced by the image producing apparatus 3, a first image output device 1 which receives the RGB signals produced by the image producing apparatus 3 or the R'G'B' signals corrected by the color reproduction processing apparatus 5C and outputs an image, and a switch 4 for switching the input to the first image output device 1.

The color production processing apparatus 5C includes a color material spectrum database 123 for registering beforehand and storing the spectral reflectivity data of various color materials, an illumination database 122 for registering beforehand and storing spectrum data of a variety of illuminations, a profile storage 6 which stores the spectral reflectivity data and the illumination spectra received from the color material spectrum database 123 and the illumination database 122, and image output device information and production-phase illumination data input from the outside, a color corrector 7 which performs color correction on the RGB signals output from the image producing apparatus 3 based on the output data from the profile storage 6, and further, as necessary, outputs the estimated spectral reflectivity of the object to a color material mixing ratio storage 121 (described below) in the middle of the color correction process, and the color material mixing ratio storage 121 which calculates and stores a mixing ratio of each color material for constituting the color of the object based on the spectral reflectivity of the object output from the color corrector 7 and the spectral reflectivity data of each color output from the color material spectrum database 123.

The profile storage 6 has almost the same structure as the one used in the first embodiment shown in FIG. 3. The object characteristic data storage section 14 stores the basis function that is generated from several pieces of the color material spectral reflectivity data output from the color material spectrum database 123 in the color production processing apparatus 5C. The view-phase illumination data storage section 21 stores the spectrum data of the illumination output from the illumination database 122 in the color production processing apparatus 5C in response to the designation by the user.

The color corrector 7 is identical to the one used in the first embodiment shown in FIG. 5. The spectral reflectivity f(λ) of the object calculated by the spectral reflectivity calculator 7*b* is output to the output tristimulus value calculator 7*c* while being output to the color material mixing ratio storage 121 at the same time as necessary.

For example, assume that the creator designs a package of a cosmetic using such constructed color reproducing apparatus. If the creator designates several color materials for use in the package, the color reproducing apparatus estimates the color mixing ratio of each color material when a color of the designed package is formed of the designated color materials.

Using the spectral reflectivity of the package constructed by the color materials, the color of the package is simulated under a variety of illuminations. For example, package design may be made selecting a color material that results in a marginal change in color in response to a change in illumination.

The sixth embodiment has substantially the same advantages as the first through fifth embodiments. Furthermore, the color mixing ratio of the color materials required to manufacture the object having a color is automatically estimated. All that is necessary is to produce a color image and to simply designate several color materials that are actually used in the manufacture of the object. The appearance of the color is simulated under a diversity of illumination lights.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image display apparatus for displaying an image on a screen, said image display apparatus comprising:

a first projector and a second projector which have substantially identical color projection characteristics, and which project respective images relating to a same object onto the screen;

wherein the first projector is arranged spatially to be upside down with respect to the second projector; and wherein the image projected by the first projector is projected to be upside down with respect to the first projector, so that the respective images projected by the first and second projectors substantially align with each other in a same orientation on the screen.

2. The image display apparatus according to claim 1, wherein the respective images projected by the first and second projectors are based on corresponding image data, and the image data is input into the first and second projectors such that the image projected by the first projector is projected to be upside down with respect to the first projector.

3. The image display apparatus according to claim 1, wherein the first and second projectors have respective optical axes which are perpendicular to the screen, and the first and second projectors project the respective images thereof at elevation angles with respect to the optical axes thereof.

4. The image display apparatus according to claim 1, wherein the first and second projectors are positioned at a same side of the screen.

5. The image display apparatus according to claim 1, wherein the first projector is provided in a plane symmetric relationship with respect to the second projector.

6. The image display apparatus according to claim 1, wherein the first projector and the second projector are arranged back to back.

7. The image display apparatus according to claim 1, further comprising a geometric correction section which performs geometric correction for the respective images projected by the first and second projectors to be superimposed on each other on the screen.

8. The image display apparatus according to claim 1, wherein each of the first and second projectors outputs at least one of a color image output of at least four primary colors, an image output for stereo-vision, and an image output for heightening image display luminance.

9. The image display apparatus according to claim 1, wherein the respective images projected at different angles onto the screen by the first and second projectors exit the screen as diffused light rays having a substantially uniform directivity.

10. The image display apparatus according to claim 1, wherein the first and second projectors are substantially identical in structure.

11. An image display apparatus for displaying an image on a screen, said image display apparatus comprising:

first projecting means for projecting an image onto a screen; and second projecting means for projecting an image onto a screen, the second projecting means having substantially identical color projection characteristics to the first projecting means;

wherein the first projecting means is arranged spatially to be upside down with respect to the second projecting means; and wherein the image projected by the first projecting means is projected to be upside down with respect to the first projecting means, so that the respective images projected by the first and second projecting means substantially align with each other in a same orientation on the screen.

* * * * *